(12) United States Patent
Saijo

(10) Patent No.: US 8,107,706 B2
(45) Date of Patent: Jan. 31, 2012

(54) INFORMATION PROCESSING APPARATUS, INFORMATION PROCESSING METHOD, PROGRAM, AND ELECTRONIC APPARATUS

(75) Inventor: Nobuhiro Saijo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/059,422

(22) PCT Filed: May 24, 2010

(86) PCT No.: PCT/JP2010/058773
§ 371 (c)(1),
(2), (4) Date: May 18, 2011

(87) PCT Pub. No.: WO2011/001761
PCT Pub. Date: Jan. 6, 2011

(65) Prior Publication Data
US 2011/0216941 A1    Sep. 8, 2011

(30) Foreign Application Priority Data
Jun. 30, 2009   (JP) ................... 2009-154921

(51) Int. Cl.
*G06K 9/00* (2006.01)
*G06K 9/46* (2006.01)
(52) U.S. Cl. .............. 382/128; 382/106; 382/190
(58) Field of Classification Search ........... 382/100–312
See application file for complete search history.

(56) References Cited

U.S. PATENT DOCUMENTS 5,031,049 A * 7/1991 Toyama et al. ............ 348/352
5,418,574 A * 5/1995 Miyabata et al. .......... 348/625
5,771,033 A * 6/1998 Katzenberger ............ 345/698

(Continued)

FOREIGN PATENT DOCUMENTS

| JP | 2003 216955 | 7/2003 |
| JP | 2003 248829 | 9/2003 |
| JP | 2005 250708 | 9/2005 |
| JP | 2006 242909 | 9/2006 |

OTHER PUBLICATIONS

U.S. Appl. No. 13/089,047, filed Apr. 18, 2011, Saijo.

(Continued)

*Primary Examiner* — Manav Seth
(74) *Attorney, Agent, or Firm* — Oblon, Spivak, McClelland, Maier & Neustadt, L.L.P.

(57) ABSTRACT

The present invention relates to an information processing apparatus, an information processing method, a program, and an electronic apparatus that are capable of detecting a movement of a hand of the user with ease.

A light-emitting apparatus 23 irradiates the user with light having a first wavelength and light having a second wavelength. A binarization section 42 acquires a first image and a second image, the first image being obtained by receiving reflected light of the light having the first wavelength with which the user is irradiated, the second image being obtained by receiving reflected light of the light having the second wavelength with which the user is irradiated. A binarization section 42 or shape extraction section 46 extracts an object area in which an object is displayed, from a skin display area in a display image including the skin display area in which a skin of the user is displayed, based on the first and second images. The shape extraction section 46 detects a change in relative distance from the irradiation means to the object in accordance with a change in luminance values of pixels constituting the object area. The present invention is applicable to a computer that extracts a shape of a portion of a body of the user from, for example, a captured image obtained by capturing an image of the user.

15 Claims, 21 Drawing Sheets

U.S. PATENT DOCUMENTS

| | | | | |
|---|---|---|---|---|
| 5,987,151 A * | 11/1999 | Akashi | | 382/100 |
| 6,104,939 A * | 8/2000 | Groner et al. | | 600/322 |
| 6,292,576 B1 * | 9/2001 | Brownlee | | 382/124 |
| 7,415,139 B2 * | 8/2008 | Takiguchi | | 382/115 |
| 7,427,981 B2 * | 9/2008 | DePue et al. | | 345/166 |
| 2006/0013454 A1 * | 1/2006 | Flewelling et al. | | 382/128 |
| 2007/0140553 A1 * | 6/2007 | Katsumata | | 382/162 |
| 2008/0304736 A1 * | 12/2008 | Nakagawa et al. | | 382/165 |

OTHER PUBLICATIONS

Suzuki, Y. et al., "Detection Method of Skin Region by Near-IR Spectrum Multi-Band", IEEJ Transactions on Electronics, Information and Systems, vol. 127, No. 4, pp. 583-590, (2007).

International Search Report issued Jun. 29, 2010 in PCT/JP10/058773 filed May 24, 2010.

\* cited by examiner

Image obtained when irradiated with 870 [nm]

US 8,107,706 B2

INFORMATION PROCESSING APPARATUS, INFORMATION PROCESSING METHOD, PROGRAM, AND ELECTRONIC APPARATUS

TECHNICAL FIELD

The present invention relates to an information processing apparatus, an information processing method, a program, and an electronic apparatus, and more particularly to, an information processing apparatus, an information processing method, a program, and an electronic apparatus that are suitable in a case where a shape of a hand of a user or the like is extracted from a captured image obtained by capturing an image of the user, for example.

BACKGROUND ART

In recent years, there has been studied a data input technique of inputting data by a gesture (motion) or a posture (pose) of a user as an input device for inputting data into a personal computer or the like, in addition to a mouse, a graphics tablet, and a touch pad.

Since data is input by, for example, a gesture or a posture of a hand of a user in the data input technique, it is necessary to precisely extract the shape or movement of the hand of the user from a captured image obtained by capturing an image of the user.

As extraction techniques for extracting the shape of the hand of the user, there are a pattern matching method using pattern matching of images, a skin area extraction method of extracting a skin area of the user, and the like.

In the pattern matching method, for example, a plurality of shape images obtained by capturing images of hands having various shapes and sizes are learned in advance, and a shape of a hand represented in a shape image that is most similar to a captured image (for example, shape image having a minimum sum of differences between pixel values of corresponding pixels) is extracted as the shape of the hand of the user.

In the pattern matching method, however, in a case where a captured image is obtained under conditions that are different from those when shape images are captured (for example, image capturing direction, level of illumination, background, size of subject when image thereof is captured, and the like), it may be impossible to precisely extract the shape of the hand of the user.

Particularly when a shape of a hand within a captured image is largely different from shapes of hands within shape images or when the hand within the captured image overlaps a face or the like in the case where the shape of the hand is extracted, the shape of the hand is difficult to be precisely extracted as compared to, for example, a case where a shape of a face is extracted.

In addition, when the shape of the hand is required to be extracted in real-time, the pattern matching needs a huge amount of calculations, which causes a problem in many cases.

Next, in the skin area extraction method, a skin area representing a skin of the user within the captured image is extracted using skin color information representing colors of the human skin.

However, in the skin area extraction method using the skin color information, it is difficult to distinguish colors of the skin from colors close thereto. Further, since colors of the skin are different between races, it is impossible to appropriately extract skin areas for all races.

In this regard, there is proposed recently an extraction technique in which spectral reflectance characteristics are used for extracting a skin area within a captured image using the fact that a reflectance change of the skin with respect to a wavelength is constant irrespective of a race (see, for example, Non-patent Document 1).

Non-patent Document 1: Yasuhiro Suzuki et al., "Detection Method of Skin Region by Near-IR Spectrum Multi-Band", IEEJ Transactions on Electronics, Information and Systems Vol. 127, No. 4, 2007, Japan

DISCLOSURE OF THE INVENTION

Problem to be Solved by the Invention

However, in the above conventional extraction technique in which the spectral reflectance characteristics are used, for example, when a face and a hand of a subject are present as skin areas within a captured image, both shapes of the face and the hand are extracted as skin areas, and therefore it is difficult to extract only the shape of the hand as a skin area.

The present invention has been made in view of the circumstances as described above, and it is adapted to extract a precise shape of a hand or the like of a user at high-speeds from a captured image obtained by capturing an image of the user while suppressing an increase of an amount of operations necessary for a series of processing. Further, the present invention is adapted to detect a movement of a hand or the like of a user with ease based on a change in luminance values or the like of pixels constituting an area corresponding to the extracted shape of the hand or the like of the user, for example, on a display image on which the user is displayed.

Means for Solving the Problem

A first information processing apparatus in a first aspect of the present invention is an information processing apparatus including: an irradiation means for irradiating the user with light having a first wavelength and light having a second wavelength that is different from the first wavelength; an acquisition means for acquiring a first image and a second image, the first image being obtained by receiving reflected light of the light having the first wavelength with which the user is irradiated, the second image being obtained by receiving reflected light of the light having the second wavelength with which the user is irradiated; an object area extraction means for extracting an object area in which an object representing a predetermined skin portion of a body of the user is displayed, from a skin display area in a display image including the skin display area in which a skin of the user is displayed, based on the first and second images; and a distance change detection means for detecting a change in relative distance from the irradiation means to the object in accordance with luminance values of pixels constituting the object area in the display image or a value calculated based on the luminance values.

It is possible to further provide a part display area detection means for detecting an area constituted of pixels included in a top n percent of large luminance values out of the pixels constituting the object area in the display image, as the part display area in which a part of the object is displayed.

In the distance change detection means, it is possible to detect a change in relative distance to the part of the object, the part being displayed in the part display area, in accordance with luminance values of pixels constituting the part display area of the object area in the display image or a value calculated based on the luminance values.

In the object area extraction means, it is possible to detect a shape area representing a shape of the object in the skin display area based on distribution of luminance values of pixels constituting the skin display area in the display image, and extract the object area corresponding to the shape area from the skin display area.

In the distance change detection means, it is possible to detect a change in relative distance from the irradiation means to the object in accordance with a change in average value of the luminance values of the pixels constituting the object area in the display image.

The first wavelength λ1 and the second wavelength λ2 can be adapted to satisfy relationships of the following expressions,

λ1<λ2, 630 nm≦λ1≦1,000 nm, and 900 nm≦λ2≦1,100 nm.

A first information processing method in the first aspect of the present invention is an information processing method for an information processing apparatus that detects a change in distance from a user, the information processing apparatus including an irradiation means, an acquisition means, an object area extraction means, and a distance change detection means, the method including: irradiating, by the irradiation means, the user with light having a first wavelength and light having a second wavelength that is different from the first wavelength; acquiring, by the acquisition means, a first image and a second image, the first image being obtained by receiving reflected light of the light having the first wavelength with which the user is irradiated, the second image being obtained by receiving reflected light of the light having the second wavelength with which the user is irradiated; extracting, by the object area extraction means, an object area in which an object representing a predetermined skin portion of a body of the user is displayed, from a skin display area in a display image including the skin display area in which a skin of the user is displayed, based on the first and second images; and detecting, by the distance change detection means, a change in relative distance from the irradiation means to the object in accordance with luminance values of pixels constituting the object area in the display image or a value calculated based on the luminance values.

A first program in the first aspect of the present invention is a program causing a computer that controls an information processing apparatus including an irradiation means for irradiating the user with light having a first wavelength and light having a second wavelength that is different from the first wavelength, to function as: an acquisition means for acquiring a first image and a second image, the first image being obtained by receiving reflected light of the light having the first wavelength with which the user is irradiated, the second image being obtained by receiving reflected light of the light having the second wavelength with which the user is irradiated; an object area extraction means for extracting an object area in which an object representing a predetermined skin portion of a body of the user is displayed, from a skin display area in a display image including the skin display area in which a skin of the user is displayed, based on the first and second images; and a distance change detection means for detecting a change in relative distance from the irradiation means to the object in accordance with luminance values of pixels constituting the object area in the display image or a value calculated based on the luminance values.

A first electronic apparatus in the first aspect of the present invention is an electronic apparatus including: an irradiation means for irradiating the user with light having a first wavelength and light having a second wavelength that is different from the first wavelength; an acquisition means for acquiring a first image and a second image, the first image being obtained by receiving reflected light of the light having the first wavelength with which the user is irradiated, the second image being obtained by receiving reflected light of the light having the second wavelength with which the user is irradiated; an object area extraction means for extracting an object area in which an object representing a predetermined skin portion of a body of the user is displayed, from a skin display area in a display image including the skin display area in which a skin of the user is displayed, based on the first and second images; a distance change detection means for detecting a change in relative distance from the irradiation means to the object in accordance with luminance values of pixels constituting the object area in the display image or a value calculated based on the luminance values; and an execution means for executing predetermined processing in response to the detection of the change in relative distance from the irradiation means to the object.

According to the first aspect of the present invention, the first image obtained by receiving the reflected light of the light having the first wavelength with which the user is irradiated, and the second image obtained by receiving the reflected light of the light having the second wavelength with which the user is irradiated, are acquired; based on the acquired first and second images, the object area in which the object representing the predetermined skin portion of the body of the user is displayed is extracted from the skin display area in the display image including the skin display area in which the skin of the user is displayed; and the change in relative distance from the irradiation means to the object is detected in accordance with the luminance values of the pixels constituting the object area in the display image or the value calculated based on the luminance values.

A second information processing apparatus in a second aspect of the present invention is an information processing apparatus that extracts a shape of an object representing a predetermined skin portion of a body of a user from a captured image obtained by capturing an image of the user, the information processing apparatus including: an irradiation means for irradiating the user with light having a first wavelength and light having a second wavelength that is different from the first wavelength; an acquisition means for acquiring a first image and a second image, the first image being obtained by receiving reflected light of the light having the first wavelength with which the user is irradiated, the second image being obtained by receiving reflected light of the light having the second wavelength with which the user is irradiated; a difference value calculation means for calculating a difference value representing a difference in reflectance between the light having the first wavelength and the light having the second wavelength, for each of pixels constituting the first or second image; a skin area extraction means for extracting a skin area representing a skin of the user based on whether the difference value calculated for each of the pixels constituting the first or second image is equal to or larger than a predetermined threshold value; and a shape area extraction means for extracting a shape area representing the shape of the object in the skin area, in which the shape area extraction means extracts the shape area based on distribution of luminance values of pixels constituting an area corresponding to the skin area in a display image in which the object and a portion of the user that corresponds to an area excluding the shape area in the skin area are displayed.

In the difference value calculation means, it is possible to calculate the difference value obtained by normalizing a difference obtained by subtracting luminance values of the second image from luminance values of the first image.

In the difference value calculation means, it is possible to calculate, as the difference value, a ratio of the luminance values of the first image and the luminance values of the second image.

A second information processing method in the second aspect of the present invention is an information processing method for an information processing apparatus that extracts a shape of an object representing a predetermined skin portion of a body of a user from a captured image obtained by capturing an image of the user, the information processing apparatus including an irradiation means, an acquisition means, a difference value calculation means, a skin area extraction means, and a shape area extraction means, the method including: irradiating, by the irradiation means, the user with light having a first wavelength and light having a second wavelength that is different from the first wavelength; acquiring, by the acquisition means, a first image and a second image, the first image being obtained by receiving reflected light of the light having the first wavelength with which the user is irradiated, the second image being obtained by receiving reflected light of the light having the second wavelength with which the user is irradiated; calculating, by the difference value calculation means, a difference value representing a difference in reflectance between the light having the first wavelength and the light having the second wavelength, for each of pixels constituting the first or second image; extracting, by the skin area extraction means, a skin area representing a skin of the user based on whether the difference value calculated for each of the pixels constituting the first or second image is equal to or larger than a predetermined threshold value; and extracting, by the shape area extraction means, a shape area representing the shape of the object in the skin area, in which the shape area extraction means extracts the shape area based on distribution of luminance values of pixels constituting an area corresponding to the skin area in a display image in which the object and a portion of the user that corresponds to an area excluding the shape area in the skin area are displayed.

A second program in the second aspect of the present invention is a program causing a computer that controls an information processing apparatus that extracts a shape of an object representing a predetermined skin portion of a body of a user from a captured image obtained by capturing an image of the user, and that includes an irradiation means for irradiating the user with light having a first wavelength and light having a second wavelength that is different from the first wavelength, to function as: an acquisition means for acquiring a first image and a second image, the first image being obtained by receiving reflected light of the light having the first wavelength with which the user is irradiated, the second image being obtained by receiving reflected light of the light having the second wavelength with which the user is irradiated; a difference value calculation means for calculating a difference value representing a difference in reflectance between the light having the first wavelength and the light having the second wavelength, for each of pixels constituting the first or second image; a skin area extraction means for extracting a skin area representing a skin of the user based on whether the difference value calculated for each of the pixels constituting the first or second image is equal to or larger than a predetermined threshold value; and a shape area extraction means for extracting a shape area representing the shape of the object in the skin area, in which the shape area extraction means extracts the shape area based on distribution of luminance values of pixels constituting an area corresponding to the skin area in a display image in which the object and a portion of the user that corresponds to an area excluding the shape area in the skin area are displayed.

A second electronic apparatus in the second aspect of the present invention is an electronic apparatus that extracts a shape of an object representing a predetermined skin portion of a body of a user from a captured image obtained by capturing an image of the user, the electronic apparatus including: an irradiation means for irradiating the user with light having a first wavelength and light having a second wavelength that is different from the first wavelength; an acquisition means for acquiring a first image and a second image, the first image being obtained by receiving reflected light of the light having the first wavelength with which the user is irradiated, the second image being obtained by receiving reflected light of the light having the second wavelength with which the user is irradiated; a difference value calculation means for calculating a difference value representing a difference in reflectance between the light having the first wavelength and the light having the second wavelength, for each of pixels constituting the first or second image; a skin area extraction means for extracting a skin area representing a skin of the user based on whether the difference value calculated for each of the pixels constituting the first or second image is equal to or larger than a predetermined threshold value; a shape area extraction means for extracting a shape area representing the shape of the object in the skin area; and an execution means for executing processing that corresponds to the extracted shape area, in which the shape area extraction means extracts the shape area based on distribution of luminance values of pixels constituting an area corresponding to the skin area in a display image in which the object and a portion of the user that corresponds to an area excluding the shape area in the skin area are displayed.

According to the second aspect of the present invention, the first image obtained by receiving the reflected light of the light having the first wavelength with which the user is irradiated, and the second image obtained by receiving the reflected light of the light having the second wavelength with which the user is irradiated, are acquired; the difference value representing a difference in reflectance between the light having the first wavelength and the light having the second wavelength is calculated for each of the pixels constituting the acquired first or second image; the skin area representing the skin of the user is extracted based on whether the difference value calculated for each of the pixels constituting the first or second image is equal to or larger than a predetermined threshold value; and the shape area representing the shape of the object in the skin area is extracted.

Effect of the Invention

According to the first aspect of the present invention, it is possible to detect a movement of a hand or the like of a user with ease. Further, according to the second aspect of the present invention, it is possible to extract a precise shape of a hand of a user or the like at high-speeds while suppressing an increase of an amount of operations necessary for a series of processing.

BEST MODES FOR CARRYING OUT THE INVENTION

Hereinafter, an embodiment for carrying out the present invention (hereinafter, referred to as this embodiment) will be described. It should be noted that a description will be given in the following order.
1. This embodiment (example of extracting shape of hand of user)
2. Modified example

1. This Embodiment

[Structure Example of Information Processing System 1]

Figure 1:
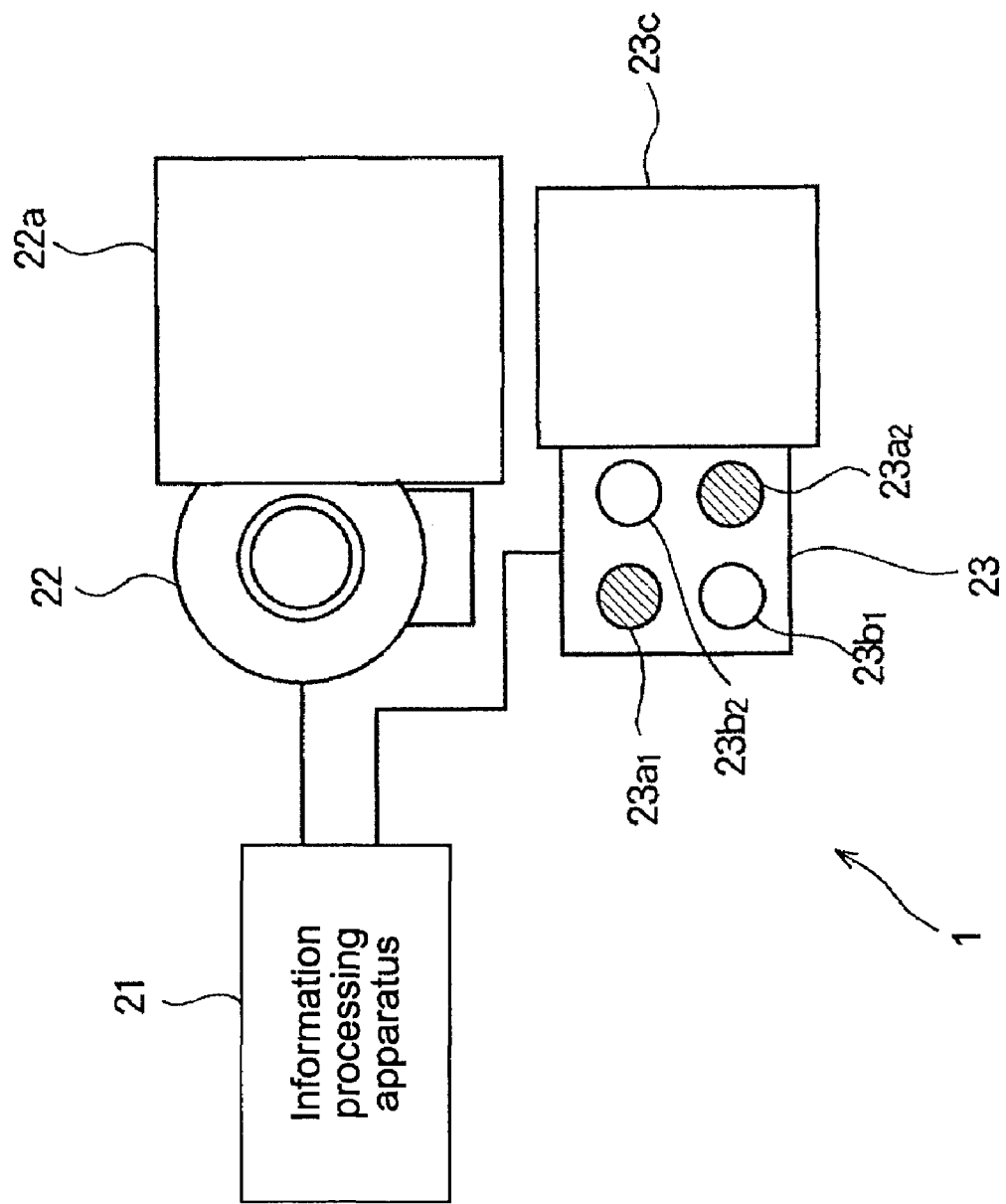
FIG. 1 is a block diagram showing a structure example of an information processing system.

FIG. 1 shows a structure example of an information processing system 1 of this embodiment.

The information processing system 1 executes predetermined processing in accordance with a gesture (or posture) made by using a hand of a user and includes an information processing apparatus 21, a camera 22, and a light-emitting apparatus 23.

In order to cause the information processing system 1 to execute the predetermined processing, the user changes a shape of his/her own hand (in front of lens surface of camera 22) or moves the hand.

In this case, the information processing system 1 recognizes the shape of the hand or the movement of the hand of the user and executes the predetermined processing in accordance with the recognition result.

It should be noted that in this embodiment, it is assumed that the user moves the hand or changes the shape of the hand in front of the lens surface of the camera 22 and makes a gesture (or posture) by moving his/her hand toward a position closer to the lens surface of the camera 22 than his/her face, chest, or the like.

The information processing apparatus 21 controls the camera 22 and the light-emitting apparatus 23. Further, the information processing apparatus 21 recognizes the shape or movement of the hand of the user based on a captured image obtained by the camera 22 capturing an image, and executes the predetermined processing in accordance with the recognition result.

The camera 22 includes a lens used for capturing an image of a subject such as a user, and a front surface of the lens is covered with a visible light cut filter 22a that cuts off visible light.

With this structure, the camera 22 receives only reflected light of invisible light that is applied to a subject by the light-emitting apparatus 23, except infrared components of sunlight or fluorescent light, and supplies the resultant captured image to the information processing apparatus 21.

Specifically, for example, the camera 22 receives only reflected light of light having a first wavelength, the light being invisible light applied to a subject by the light-emitting apparatus 23 (for example, near-infrared light of 870 [nm]), and supplies the resultant first captured image to the information processing apparatus 21.

Further, the camera 22 receives only reflected light of light having a second wavelength different from the first wavelength, the light being invisible light applied to the subject by the light-emitting apparatus 23 (for example, near-infrared light of 950 [nm]), and supplies the resultant second captured image to the information processing apparatus 21.

It should be noted that in this embodiment, an image is captured by the camera 22 under conditions in which the influence of the infrared components of external light such as sunlight and fluorescent light (for example, near-infrared light of 870 [nm] or near-infrared light of 950 [nm]) can substantially be ignored.

A general camera has higher light-receiving sensitivity in a visible light region than in an infrared region. Therefore, it is possible to reduce the influence of the visible light by providing the visible light cut filter 22a. Accordingly, since the reflected light of the light applied to the subject from the light-emitting apparatus 23 can be received while hardly receiving the influence of the visible light, it is possible to improve the robustness of skin detection using spectral reflectance characteristics.

In addition, in the following description, the front surface of the lens of the camera 22 is covered with the visible light cut filter 22a. However, for example, it may be possible to structure so that the front surface of the lens of the camera 22 is not covered with the visible light cut filter 22a in a situation where the influence of the visible light can substantially be ignored.

The light-emitting apparatus 23 includes LEDs (light emitting diodes) $23a_1$ and $23a_2$ that emit light having the first wavelength and LEDs $23b_1$ and $23b_2$ that emit light having the second wavelength.

It should be noted that in a case where the LEDs $23a_1$ and $23a_2$ need not to be distinguished from each other hereinafter, the LEDs $23a_1$ and $23a_2$ are referred to simply as LEDs $23a$. Further, in a case where the LEDs $23b_1$ and $23b_2$ need not to be distinguished from each other, the LEDs $23b_1$ and $23b_2$ are referred to simply as LEDs $23b$.

The LEDs $23a$ and $23b$ alternately emit light in accordance with the control of the information processing apparatus 21.

Further, the outputs of the LEDs $23a$ and LEDs $23b$ are adjusted so that intensities (amounts of light) of the reflected light received by the camera 22 become equal in the reflected light of the light having the first wavelength and the reflected light of the light having the second wavelength.

Specifically, in a case where the relative sensitivity characteristics of the camera 22 with respect to the light having the first wavelength is the same as the relative sensitivity characteristics of the camera 22 with respect to the light having the second wavelength, in order that a luminance value obtained when the light having the first wavelength is applied to an object having the same reflectance in the light having the first and second wavelengths (for example, mirror or the like), and a luminance value obtained when the light having the second wavelength is applied thereto are set to be an equal value, an adjustment is made so that intensities (amounts of light) of the reflected light received by the camera 22 become equal.

Incidentally, as described later with reference to FIG. 18, the relative sensitivity characteristics of the camera 22 generally tends to become small as a distance from the visible light region increases. For example, as compared to the sensitivity in 870 [nm], the sensitivity in 950 [nm] becomes ½ or less.

Therefore, generally, the outputs of the LEDs $23a$ and LEDs $23b$ are adjusted in accordance with, for example, the relative sensitivity characteristics or the like of the camera 22 so that the luminance value obtained when the light having the first wavelength is applied to the object having the same reflectance in the light having the first and second wavelengths, and the luminance value obtained when the light having the second wavelength is applied thereto become equal.

In addition, the LEDs $23a$ and LEDs $23b$ are alternately arranged in a grid as shown in FIG. 1 and a diffuser plate $23c$ that uniformly diffuses light emitted from the LEDs $23a$ and LEDs $23b$ is provided in front of the LEDs $23a$ and LEDs $23b$. With this, the subject is irradiated with the light having first and second wavelengths without unevenness.

It should be noted that in a case where the light having first and second wavelengths is applied without unevenness by only the LEDs $23a$ and LEDs $23b$, the diffuser plate $23c$ may not be provided in front of the LEDs $23a$ and LEDs $23b$.

In addition, the light-emitting apparatus 23 is arranged at a position where the light emitted from the LEDs $23a$ or LEDs $23b$ is reliably applied to at least a hand of a user. In this embodiment, the user changes a shape of a hand in front of the lens surface of the camera 22, and accordingly the light-emitting apparatus 23 is arranged close to the camera 22, for example.

Although this embodiment describes that the light-emitting apparatus 23 is arranged close to the camera 22, the positional relationship between the light-emitting apparatus 23 and the camera 22 is not limited thereto. In other words, any positional relationship may be possible as long as it is a positional relationship in which the hand of the user that is positioned in front of the lens surface of the camera 22 can be irradiated with light and the reflection light obtained due to the irradiation can be reliably received by the camera 22.

Specifically, for example, if the light-emitting apparatus 23 and the camera 22 closely arranged are separated from each other and the light-emitting apparatus 23 is arranged at a position closer to a hand of a user than the camera 22, a distance between the light-emitting apparatus 23 and the hand of the user can be shortened as compared to the case where the light-emitting apparatus 23 and the camera 22 are arranged close to each other.

In this case, since the distance between the light-emitting apparatus 23 and the hand of the user is shortened as compared to the case where the light-emitting apparatus 23 and the camera 22 are arranged close to each other, the consumed power of the light-emitting apparatus 23 can be reduced.

[Structure Example of Information Processing Apparatus 21]

Figure 2:
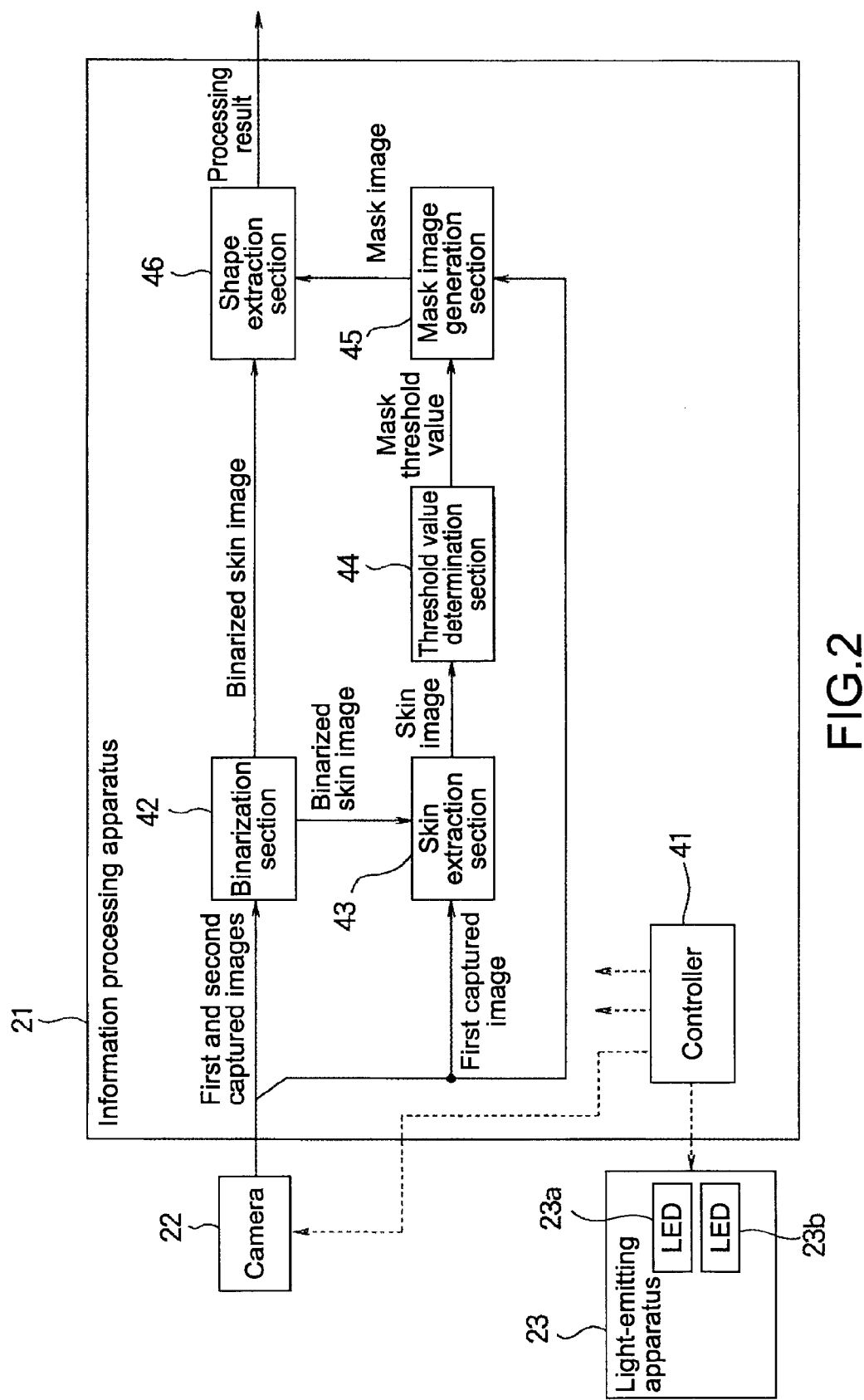
FIG. 2 is a block diagram showing a structure example of an information processing apparatus.

FIG. 2 shows a structure example of the information processing apparatus 21.

The information processing apparatus 21 includes a controller 41, a binarization section 42, a skin extraction section 43, a threshold value determination section 44, a mask image generation section 45, and a shape extraction section 46.

The controller 41 controls the light-emitting apparatus 23 and causes the LEDs $23a$ and LEDs $23b$ to emit light alternately.

The binarization section 42 is supplied with the first captured image and the second captured image from the camera 22. Based on the first and second captured images supplied from the camera 22, the binarization section 42 extracts (detects) a skin area representing the skin of the user and an area excluding the skin area from the first captured image.

It should be noted that although the binarization section 42 adopts the first captured image as a target from which a skin area and an area excluding the skin area are extracted, the binarization section 42 can adopt others, for example, the second captured image as an extraction target as described later.

Then, the binarization section 42 generates a binarized skin image obtained by binarizing pixel values of pixels constituting the extracted skin area and pixel values of pixels constituting the area excluding the skin area into different values (for example, 0 and 1), and supplies the binarized skin image to the skin extraction section 43 and the shape extraction section 46.

The skin extraction section 43 and the mask image generation section 45 are supplied with the first captured image from the camera 22.

Based on the binarized skin image supplied from the binarization section 42, the skin extraction section 43 extracts an area corresponding to the skin area within the binarized skin image (area representing skin area of user) from the first captured image supplied from the camera 22.

Then, the skin extraction section 43 generates a skin image including the extracted area and supplies the skin image to the threshold value determination section 44. It should be noted that the skin extraction section 43 may supply the extracted area as a skin image to the threshold value determination section 44.

The threshold value determination section 44 creates a histogram of (luminance values of pixels constituting) the skin image based on the skin image supplied from the skin extraction section 43. Then, the threshold value determination section 44 determines a mask threshold value that is used for generating a mask image (described later) based on the created histogram of the skin image and supplies the mask threshold value to the mask image generation section 45.

It should be noted that in this embodiment, the threshold value determination section 44 uses, for example, the histogram of the skin image as one representing distribution of the luminance values of pixels constituting the skin image in order to determine a mask threshold value. However, though not limited to the histogram of the skin image, any information may be possible as long as the distribution of the luminance values of pixels constituting the skin image is represented.

Further, as described later with reference to FIG. 7, the threshold value determination section 44 calculates a maximum value or local minimum of the luminance values of pixels constituting the skin image based on the histogram of the skin image, and determines it as a mask threshold value, but not limited thereto.

Specifically, for example, the threshold value determination section 44 may calculate an average value, a dispersion value, a minimum value, a maximum value, or the like of the luminance values of pixels constituting the skin image based on the histogram of the skin image, and determine a mask threshold value by using the calculated average value, dispersion value, minimum value, maximum value, or the like.

The mask image generation section 45 generates a mask image from the first captured image supplied from the camera 22 based on the mask threshold value supplied from the threshold value determination section 44, and supplies the mask image to the shape extraction section 46.

It should be noted that the mask image refers to an image binarized into a mask area constituted of the pixels having luminance values within a range of luminance values specified by the mask threshold value, and a non-mask area excluding the mask area, in the region within the first captured image.

Based on the mask image from the mask image generation section 45, the shape extraction section 46 extracts a shape area representing the shape of the hand of the user, for example, as an area corresponding to the mask area within the mask image, from the binarized skin image supplied from the binarization section 42.

Then, the shape extraction section 46 recognizes the shape of the hand based on the extracted shape area, performs processing corresponding to the recognition result, and outputs the processing result to a subsequent stage.

It should be noted that the binarization section 42 extracts the skin area and the area excluding the skin area from the first captured image, but the binarization section 42 may extract a skin area and an area excluding the skin area from the second captured image. In this case, the skin extraction section 43 and the mask image generation section 45 are supplied with the second captured image from the camera 22, instead of the first captured image.

Then, the skin extraction section 43 generates a skin image from the second captured image and the mask image generation section 45 generates a mask image from the second captured image.

In addition, for example, the skin extraction section 43 may extract a skin area and an area excluding the skin area from a new combined image obtained by combining the first captured image and the second captured image at a predetermined ratio (for example, a combined image with averages of luminance values of corresponding pixels of the first and second captured images as luminance value (combined image combined at a ratio of 1:1), or the like).

In other words, the skin extraction section 43 can adopt an image as a target image from which a skin area and an area excluding the skin area are extracted, as long as the image is a display image in which a subject that is the same as the subject displayed in the first or second captured image is displayed at the same position.

[Generation of Binarized Skin Image]

Next, processing in which the binarization section 42 generates a binarized skin image will be described in detail with reference to FIGS. 3 to 5.

It should be noted that in FIGS. 3 and 4, the first captured image and the second captured image that are captured by the camera 22 will be described. Further, in FIG. 5, a binarized skin image generated by the binarization section 42 based on the first captured image and the second captured image will be described.

Figure 3:
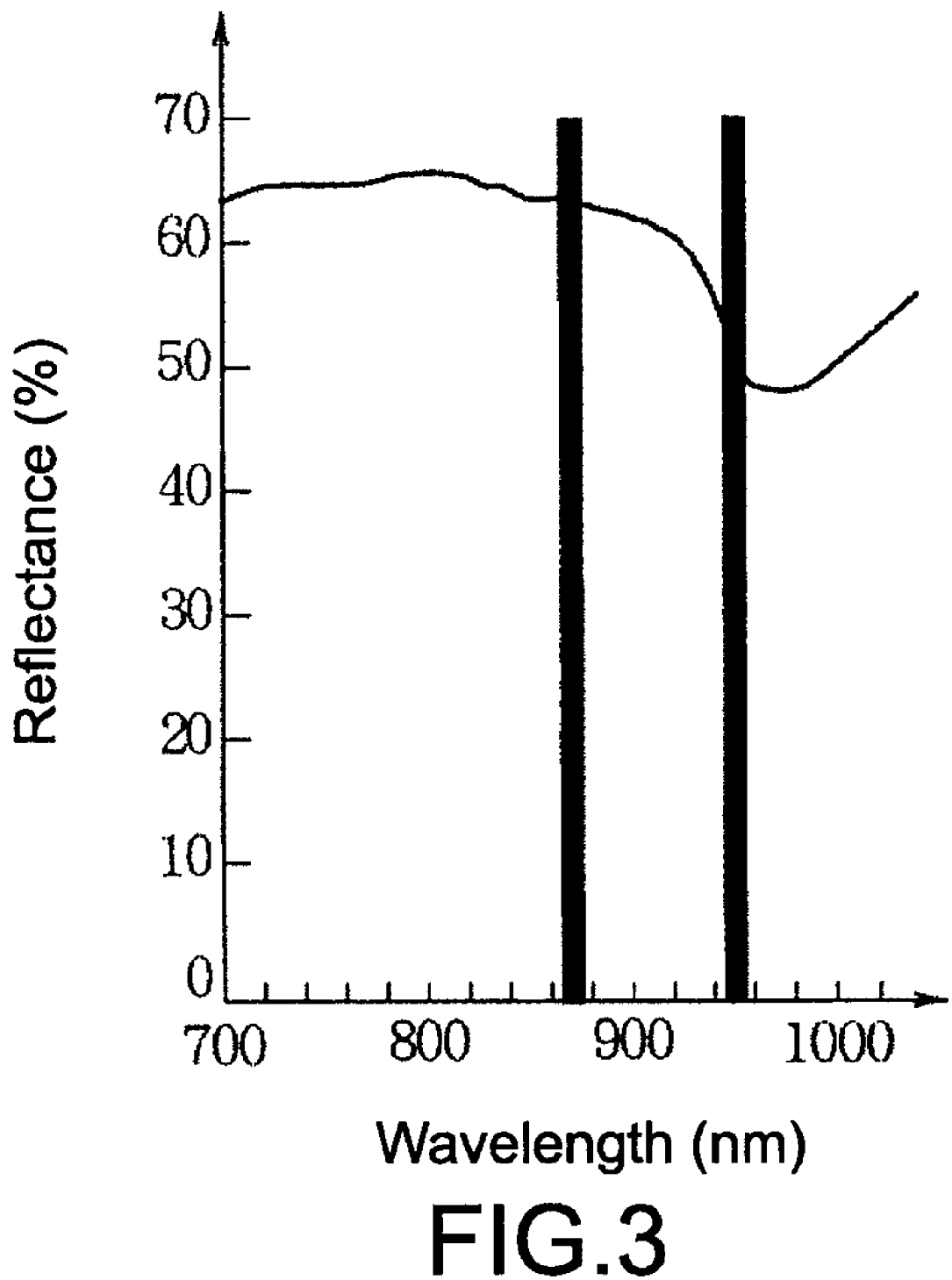
FIG. 3 is a diagram showing an example of reflection characteristics of a human skin.

FIG. 3 shows reflection characteristics of a human skin with respect to irradiation light having different wavelengths.

It should be noted that the reflection characteristics are universal irrespective of a difference in color of the human skin (difference in race) or a state of the human skin (suntan or the like).

In FIG. 3, the horizontal axis represents a wavelength of light to be applied to the human skin, and the vertical axis represents a reflectance of the light applied to the human skin.

It is known that the reflectance of the light applied to the human skin sharply decreases from the vicinity of 900 [nm] with the vicinity of 800 [nm] as a peak, and increases again with the vicinity of 1,000 [nm] as a local minimum.

Specifically, as shown in FIG. 3, for example, a reflectance of reflected light that is obtained by applying the light of 870 [nm] to the human skin is about 63[%] and a reflectance of reflected light that is obtained by applying the light of 950 [nm] thereto is about 50[%].

This is peculiar to the human skin, and regarding objects other than the skin of humans (for example, hair or clothes), a change in reflectance often becomes gentle in the vicinity of 800 to 1,000 [nm]. It should be noted that though illustration is omitted, in the example of the hair, a reflectance also becomes raised gently in the vicinity of 800 to 1,000 [nm] as the wavelength is longer. In addition, in the example of the hair, a reflectance of reflected light that is obtained by applying the light of 870 [nm] is about 6[%] and a reflectance of reflected light that is obtained by applying the light of 950 [nm] is about 8[%].

Next, the first and second captured images obtained by the camera 22 will be described with reference to FIG. 4.

Figure 4:
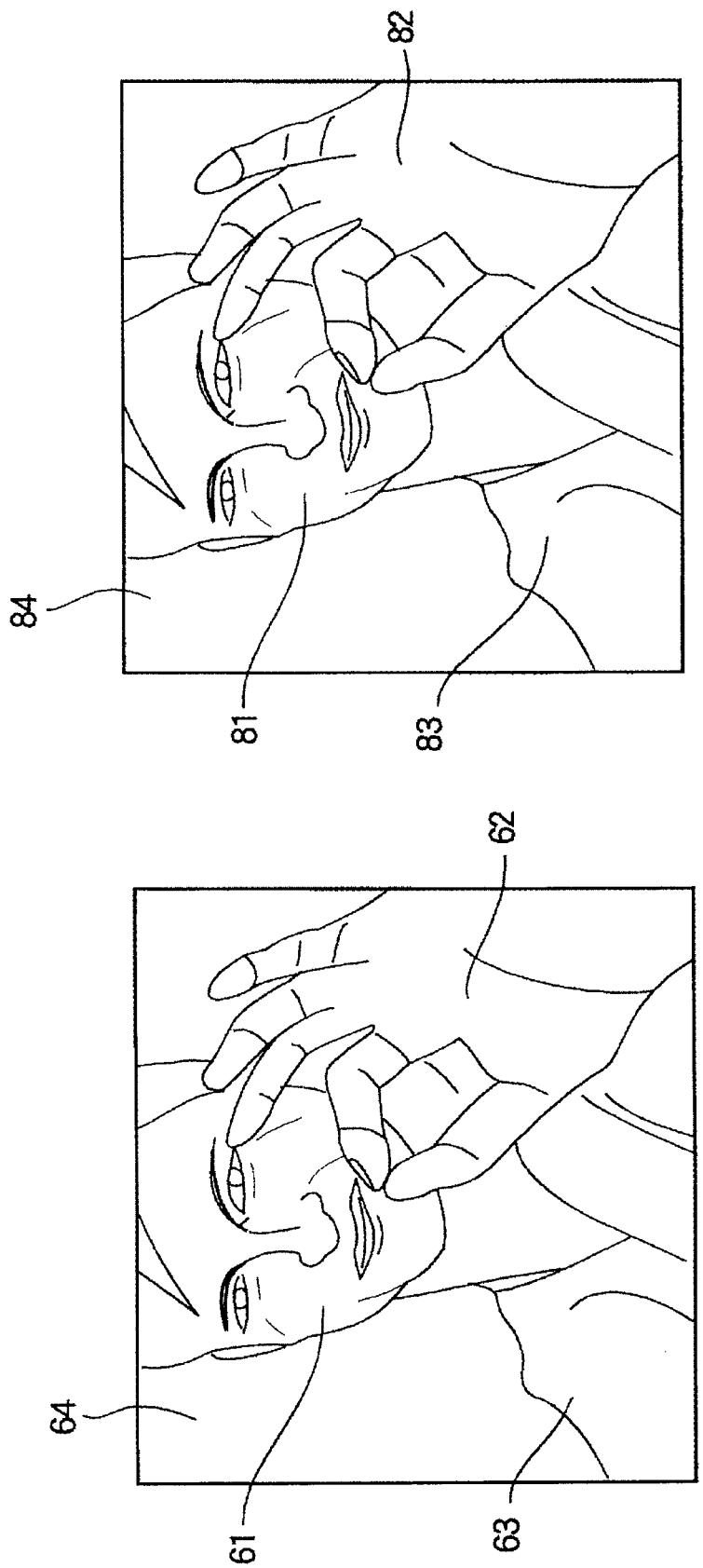
FIG. 4 is a diagram showing an example of first and second captured images.

FIG. 4 shows an example of each of a first captured image obtained by receiving reflected light of light that has a wavelength of 870 [nm] and is applied to a user, and a second captured image obtained by receiving reflected light of light that has a wavelength of 950 [nm] and is applied to a user.

A of FIG. 4 shows the first captured image in which a face 61 and a hand 62 of the user are displayed as a skin area of the user, and a shirt 63 that the user wears and a background 64 are displayed as an area excluding the skin area of the user.

Further, B of FIG. 4 shows the second captured image in which a face 81 and a hand 82 of the user are displayed as a skin area of the user, and a shirt 83 that the user wears and a background 84 are displayed as an area excluding the skin area of the user.

Here, as described in FIG. 3, as to the reflection characteristics in the skin portion of the user, the reflectance of the light having the wavelength of 870 [nm] is larger than the reflectance of the light having the wavelength of 950 [nm].

Accordingly, in a case where the light having the wavelength of 870 [nm] is applied to the user, as reflected light of the light applied to the skin portion of the user, light brighter than the reflected light of the case where the light of 950 [nm] is applied enters the lens of the camera 22.

As a result, luminance values of pixels constituting the skin area of the user (face 61 and hand 62) within the first captured image take larger values than luminance values of pixels constituting the skin area of the user (face 81 and hand 82) within the second captured image.

Accordingly, differences obtained by subtracting the luminance values of the pixels constituting the skin area of the user within the second captured image from the luminance values of the pixels constituting the corresponding skin area of the user within the first captured image take positive values.

In contrast to the above, as to the reflection characteristics in the portion excluding the skin portion of the user, the reflectance of the light having the wavelength of 870 [nm] is equal to or smaller than the reflectance of the light having the wavelength of 950 [nm] in some cases.

Accordingly, in a case where the light of 870 [nm] is applied to the user, as reflected light of the light applied to the portion excluding the skin portion of the user, light that is as bright as or darker than the reflected light of the case where the light of 950 [nm] is applied enters the lens of the camera 22.

Therefore, luminance values of pixels constituting the area excluding the skin area of the user (shirt 63 and background 64) within the first captured image take values equal to or smaller than luminance values of pixels constituting the area excluding the skin area of the user (shirt 83 and background 84) within the second captured image.

Accordingly, differences obtained by subtracting, from the luminance values of the pixels constituting the portion excluding the skin portion of the user within the first captured image, the luminance values of the pixels constituting a portion of the skin portion of the user within the second captured image take values equal to or smaller than 0 (values excluding positive values).

Therefore, the binarization section 42 calculates differences between luminance values of corresponding pixels of the first captured image and the second captured image and extracts the skin area of the user and the area excluding the skin area of the user based on the calculated differences. Then, the binarization section 42 generates a binarized skin image in which the extracted skin area of the user is set to a value 1 and the area excluding the extracted skin area of the user is set to a value 0.

In other words, for example, in a case where the calculated differences (differences obtained by subtracting, from the luminance values of the pixels constituting the first captured image, the luminance values of the corresponding pixels constituting the second captured image) are positive values, the binarization section 42 extracts the corresponding pixels as those constituting the skin area of the user, and in a case where the calculated differences are not positive values, extracts the corresponding pixels as those constituting the area excluding the skin area of the user.

Then, the binarization section 42 sets each of pixel values of the pixels extracted as those constituting the skin area of the user to 1, and each of pixel values of the pixels extracted as those constituting the area excluding the skin area of the user to 0, to thereby generate a binarized skin image, and supplies the binarized skin image to the skin extraction section 43 and the shape extraction section 46.

It should be noted that a case where the differences calculated for the portion excluding the skin portion are smaller than the differences calculated for the skin portion but take positive values may occur depending on a reflectance in the portion excluding the skin portion of the user. Therefore, in a case where the differences take positive values but are smaller than a predetermined threshold value, it is desirable to assume the portion excluding the skin portion of the user and set the pixel value 0 therefor.

Specifically, it is desirable to generate a binarized skin image such that the binarization section 42 judges whether the calculated differences are equal to or larger than a predetermined threshold value set in advance, and in a case of the differences equal to or larger than a predetermined threshold value, extracts the corresponding pixels as the pixels constituting the skin area of the user, and in a case of the differences not equal to or larger than a predetermined threshold value, extracts the corresponding pixels as the pixels constituting the area excluding the skin area of the user.

Here, a difference $L1-L2$ between a luminance value $L1$ of each of the pixels constituting the first captured image and a luminance value $L2$ of each of the pixels corresponding thereto and constituting the second captured image correspond to the difference between the reflectance of the light having the first wavelength and the reflectance of the light having the second wavelength in the subject. Therefore, the difference $L1-L2$ in the skin area takes a constant value $C1$ ($L1-L2=63[\%]-50[\%]=13$), ideally.

However, in reality, the luminance values $L1$ and $L2$ in the skin area can be changed due to a distance from the light-emitting apparatus 23 to the subject, image capturing conditions of the camera 22, and the like. Therefore, there may occur a case where the difference $L1-L2$ in the skin area does not take a constant value $C1$.

In this case, the binarization section 42 needs to use different threshold values for each difference $L1-L2$, which causes very complicated processing.

In this regard, the binarization section 42 normalizes the difference $L1-L2$ and sets the difference $L1-L2$ to a constant value $C2$ corresponding to the difference between the reflectance of the light having the first wavelength and the reflectance of the light having the second wavelength, to thereby use the same threshold value in the plurality of differences $L1-L2$.

In this manner, for example, if normalizing (dividing) the difference $L1-L2$ by the luminance value $L1$ or $L2$, the binarization section 42 can use the same threshold value prepared in advance with respect to the difference obtained after normalization, $(L1-L2)/L1$ or $(L1-L2)/L2$. Therefore, it is unnecessary to prepare different threshold values for each of the differences $L1-L2$. It should be noted that the example in which the normalization is performed by the luminance value $L1$ or $L2$ has been described, but the difference may be normalized by a luminance-value-relating value that relates to the luminance value $L1$ or $L2$. For example, normalization is performed by $(L1+L2)/2$ or $(L1+L2)$.

Accordingly, it is possible to reduce a capacity of a memory (not shown) that the binarization section 42 incorporates in order to store a threshold value in advance. Further, if the binarization section 42 uses the same threshold value irrespective of the differences $L1-L2$, the time and effort for changing a threshold value for each difference $L1-L2$ can be saved. Therefore, it is possible to suppress an amount of operations for generating a binarized skin image and to generate the binarized skin image more rapidly.

It should be noted that as another method, the binarization section 42 can be configured to extract a skin area and a non-skin area based on the ratio $L1/L2$, not the difference $L1-L2$. This uses the fact that even when the luminance values $L1$ and $L2$ in the skin area are changed due to the distance from the light-emitting apparatus 23 to the subject, image capturing conditions of the camera 22, and the like, the ratio L1/L2 (=63[%]/50[%]) in the skin area becomes a constant value C3.

It should be noted that in a case where the ratio L1/L2 is used, for example, a constant value C3−α (α>0) is adopted as a threshold value compared with the ratio L1/L2. In a case where the ratio L1/L2 is larger than the threshold value, the binarization section 42 performs extraction as a skin area, and in a case where the ratio L1/L2 is smaller than the threshold value, the binarization section 42 performs extraction as a non-skin area.

Further, the binarization section 42 may calculate difference absolute values between luminance values of corresponding pixels of the first captured image and the second captured image, and based on whether the calculated difference absolute values are equal to or larger than a predetermined threshold value, extract the skin portion (skin area) of the user and the other portion (area excluding the skin area) to generate a binarized skin image.

This uses the fact that due to the reflection characteristics, the difference absolute values corresponding to the skin portion of the user take relatively large values and the difference absolute values corresponding to the portion excluding the skin portion of the user take relatively small values.

Further, even in a case where the difference absolute values are used, it becomes possible to use the same threshold value in any difference absolute value by the normalization using the luminance value L1 or L2 or the like.

It should be noted that in the method using the difference absolute values, there is a fear that objects, such as a skin and hair, whose reflectances increase/decrease conversely in the vicinity of the first and second wavelengths are erroneously detected. Therefore, it is desirable to extract a skin area with the luminance value taken into consideration. In other words, for example, only portions that are high in luminance value L1 (or luminance value L2) out of the skin areas extracted using the difference absolute values may be extracted as an ultimate skin area.

Figure 5:
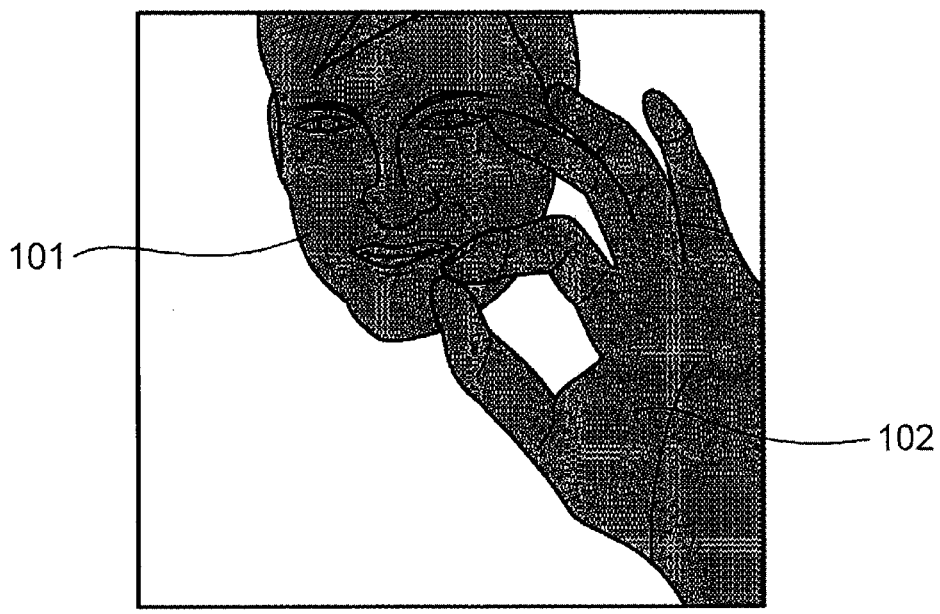
FIG. 5 is a diagram showing an example of a binarized skin image generated by a binarization section.

Next, FIG. 5 shows an example of the binarized skin image generated by the binarization section 42.

In the binarized skin image shown in FIG. 5, a portion shown in black indicates a skin area represented by the value 1. This skin area is constituted of a face area 101 indicating a skin portion of the face of the user, and a hand area 102 indicating a skin portion of the hand of the user.

It should be noted that the face area 101 shown in FIG. 5 includes eyebrows, eyes, hair, and the like in addition to the skin portion of the face for convenience of the illustration, but the face area 101 is constituted of only the skin portion of the face in actuality.

In addition, in the binarized skin image shown in FIG. 5, a portion shown in white indicates an area excluding the skin area, which is represented by the value 0.

The binarization section 42 supplies the generated binarized skin image to the skin extraction section 43 and the shape extraction section 46.

The skin extraction section 43 extracts, from the first captured image supplied from the camera 22, an area corresponding to the face area 101 and the hand area 102 within the binarized skin image (area in which face 61 and hand 62 are displayed) based on the binarized skin image supplied from the binarization section 42. Then, the skin extraction section 43 generates a skin image including the extracted area.

[Generation of Skin Image]

Subsequently, processing in which the skin extraction section 43 generates a skin image from the first captured image based on the binarized skin image supplied from the binarization section 42 will be described with reference to FIG. 6.

Figure 6:
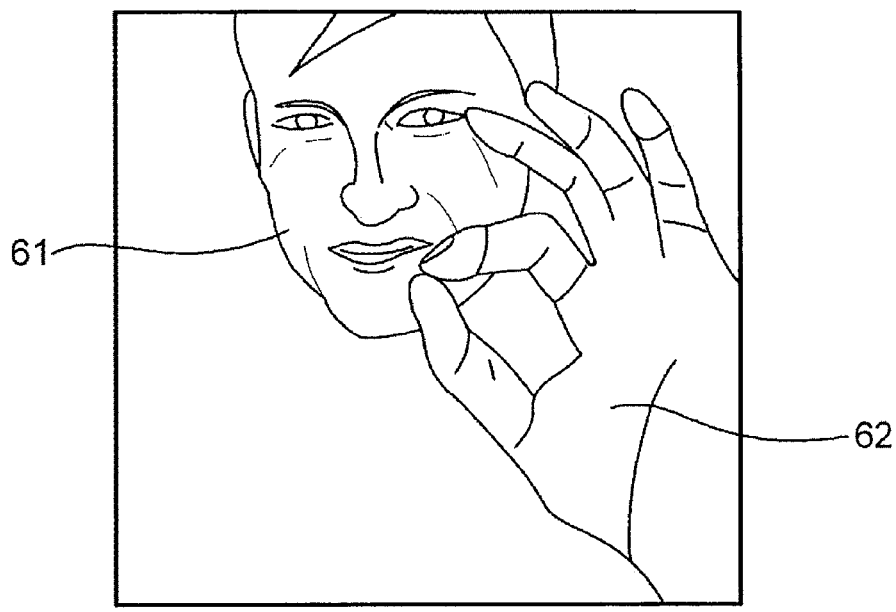
FIG. 6 is a diagram showing a first example of a skin image extracted by a skin extraction section.

FIG. 6 shows an example of the skin image extracted by the skin extraction section 43. The skin image shown in FIG. 6 shows the face 61 and the hand 62 of the user.

It should be noted that the skin image shown in FIG. 6 includes, as the face 61 of the user, eyebrows, eyes, hair, and the like in addition to the skin portion of the face for convenience of the illustration, but the face 61 shown in FIG. 6 represents only the skin portion of the face in actuality.

The skin extraction section 43 multiplies the luminance values of the pixels of the binarized skin image supplied from the binarization section 42 and those of corresponding pixels of the first captured image supplied from the camera 22.

Then, the skin extraction section 43 extracts, out of the pixels constituting the first captured image, an area constituted of pixels whose multiplication results are not 0 (area in which face 61 and hand 62 are displayed), and generates a skin image including the extracted area.

Accordingly, out of the areas within the first captured image, the face 61 included in the area corresponding to the face area 101 of the binarized skin image and the hand 62 included in the area corresponding to the hand area 102 of the binarized skin image are extracted as they are. The area corresponding to the area excluding the skin area in the binarized skin image (shown in white in FIG. 6) is given a luminance value of 225, for example, and then a skin image as shown in FIG. 6 is generated from the first captured image.

The skin extraction section 43 supplies the generated skin image to the threshold value determination section 44.

The threshold value determination section 44 determines a mask threshold value used for generating a mask image based on the skin image supplied from the skin extraction section 43.

[Determination of Mask Threshold Value]

Next, processing in which the threshold value determination section 44 determines a mask threshold value will be described in detail with reference to FIG. 7.

Figure 7:
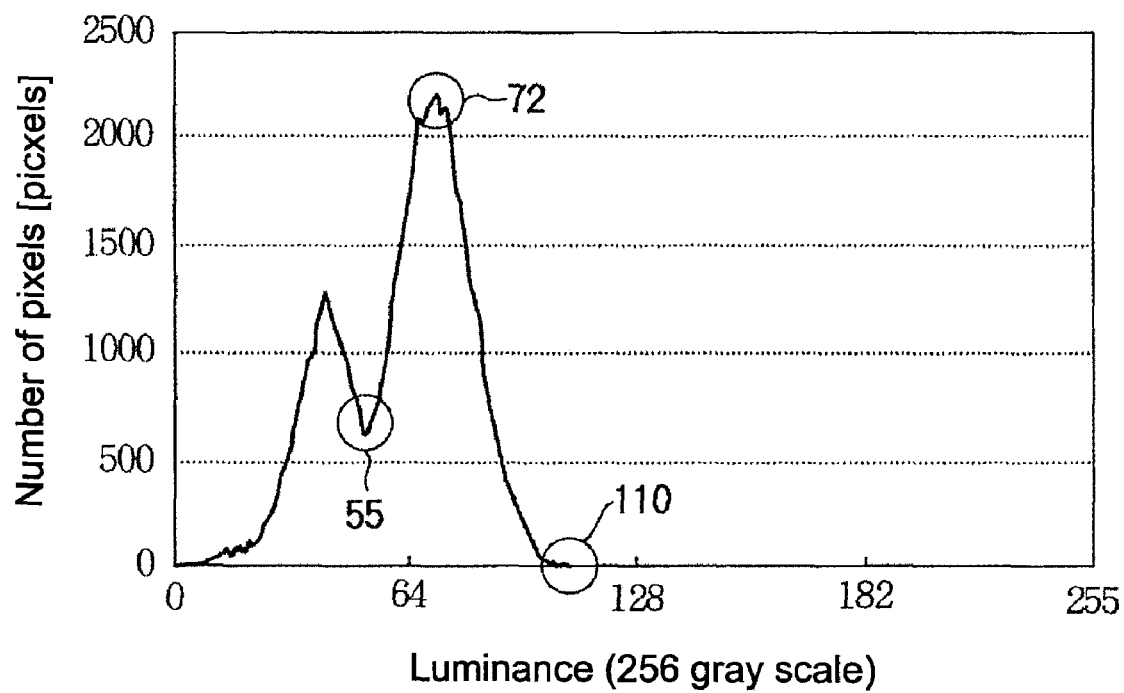
FIG. 7 is a diagram showing a first example of a histogram of a skin image.

FIG. 7 shows an example of a histogram of the skin image.

In FIG. 7, the horizontal axis indicates luminance values of pixels constituting the skin image. Further, the vertical axis indicates the pixel number of pixels corresponding to the luminance values of the horizontal axis.

It should be noted that the number of pixels constituting the area shown in white and having the luminance value of 225 in the skin image of FIG. 6 is normally shown in the histogram of FIG. 7, but illustration thereof is omitted because the number of pixels with the luminance value of 225 is not used for determining the mask threshold value.

The threshold value determination section 44 creates a histogram as shown in FIG. 7 regarding the luminance values of the pixels constituting the skin image supplied from the skin extraction section 43.

In the histogram of FIG. 7, a large number of pixels are concentrated between a luminance value 0 and a luminance value 54 and between a luminance value 55 and a luminance value 110.

Incidentally, as described above, it is assumed that the hand is located close to the camera 22 and the face, chest, or the like is located far from the camera 22.

Further, for example, since the LEDs 23a and LEDs 23b of the light-emitting apparatus 23 emit light while being close to the camera 22, a part of the user (in this case, hand) that is located closer to the camera 22 (light-emitting apparatus 23) has a larger luminance value and a part of the user (in this case, face or the like) that is located farther from the camera 22 has a smaller luminance value.

Accordingly, the luminance values of the pixels constituting the skin portion of the hand that is located close to the camera 22 takes larger values than the luminance values of the pixels constituting the skin portion of the face that is located far from the camera 22.

Therefore, the luminance values between the luminance value 0 and the luminance value 54 are those of the pixels constituting (an area of) the face 61, and the luminance values between the luminance value 55 and the luminance value 110 are those of the pixels constituting the hand 62.

The threshold value determination section 44 determines a luminance value at a time when the number of pixels becomes local minimum (in this example, luminance value 55) as a lower limit threshold value Th_L, and a maximum luminance value (in this case, luminance value 110) as an upper limit threshold value Th_H.

It should be noted that the lower limit threshold value Th_L may be obtained as follows, for example. Specifically, for example, the threshold value determination section 44 generates a function y=f(x) (y represents the number of pixels, and x represents a luminance value) representing the histogram as shown in FIG. 7. Then, the threshold value determination section 44 differentiates the generated function f(x) once to generate a first derivative f'(x), and determines x (for example, x=55) obtained when the first derivative f'(x) changes from a negative value to a positive value and when the function f'(x)=0, that is, x obtained when the function f(x) becomes local minimum, as a lower limit threshold value Th_L.

Further, a maximum luminance value is determined as the upper limit threshold value Th_H, but others, for example, a value of x obtained when the first derivative f'(x) changes from a negative value to value 0 (for example, x=110) may be determined as an upper limit threshold value Th_H.

Incidentally, as described above, the threshold value determination section 44 can also determine a mask threshold value by using an average value, a dispersion value, a minimum value, a maximum value, or the like of the luminance values of pixels constituting the skin image.

Specifically, for example, the threshold value determination section 44 may determine an average value of the luminance values of pixels constituting the skin area, as a lower limit threshold value Th_L, or may determine ½ of a maximum value of the luminance values of pixels constituting the skin area, as an upper limit threshold value Th_H. In addition, for example, the threshold value determination section 44 may determine an average of a minimum value and a maximum value of the luminance values of pixels constituting the skin area, as a lower limit threshold value Th_L.

Further, the threshold value determination section 44 may prepare in advance a threshold value determination function for determining a lower limit threshold value Th_L for each dispersion value, for example, and determine a lower limit threshold value Th_L by the threshold value determination function corresponding to a dispersion value on luminance values of pixels constituting the skin area. It should be noted that the threshold value determination function can adopt, for example, a function or the like that has a minimum value, a maximum value, or the like on luminance values of pixels constituting the skin area, as a variable.

In this case, the function f(x) is generated and the first derivative f'(x) is further generated from the generated function f(x), and thus a value to be determined as a lower limit threshold value Th_L can be calculated easily as compared to a case where a lower limit threshold value Th_L is determined based on the first derivative f'(x). Therefore, it is possible to determine a lower limit threshold value Th_L more rapidly.

It should be noted that, for example, the threshold value determination section 44 determines a maximum value on luminance values of pixels constituting the skin area, as an upper limit threshold value Th_H, but as in the case of the lower limit threshold value Th_L, an upper limit threshold value Th_H can be determined using an average value, a dispersion value, a minimum value, a maximum value, or the like of the luminance values of pixels constituting the skin image.

Specifically, for example, since other skin portion is displayed other than the face 61 and the hand 62 in the skin image of FIG. 6, a luminance value larger than a value 110 is present in the histogram of FIG. 7. Therefore, in a case where the luminance value 110 is local minimum, or the like, like the luminance value 55, an upper limit threshold value Th_H can be determined similarly to a lower limit threshold value Th_L.

The threshold value determination section 44 supplies the determined lower limit threshold value Th_L and upper limit threshold value Th_H, as mask threshold values, to the mask image generation section 45.

Based on the mask threshold values (lower limit threshold value Th_L and upper limit threshold value Th_H) supplied from the threshold value determination section 44, the mask image generation section 45 detects a mask area and a non-mask area from the first captured image supplied from the camera 22, and generates a mask image in which the detected mask area and non-mask area are binarized into different values.

Specifically, for example, the mask image generation section 45 detects a mask area constituted of the pixels each having a luminance value that is equal to or larger than the lower limit threshold value Th_L and equal to or smaller than the upper limit threshold value Th_H, as an area corresponding to a part of the user (in this case, hand) whose luminance value is large because it is located closer to the light-emitting apparatus 23.

Further, for example, the mask image generation section 45 detects a non-mask area constituted of the pixels each having a luminance value that is not included in a range equal to or larger than the lower limit threshold value Th_L and equal to or smaller than the upper limit threshold value Th_H, as an area corresponding to a part of the user (in this case, face or the like) whose luminance value is small because it is located far from the light-emitting apparatus 23.

Then, the mask image generation section 45 generates a mask image in which the detected mask area and non-mask area are binarized into different values.

[Generation of Mask Image]

Next, processing in which the mask image generation section 45 generates a mask image based on the mask threshold values from the threshold value determination section 44 will be described in detail with reference to FIG. 8.

Figure 8:
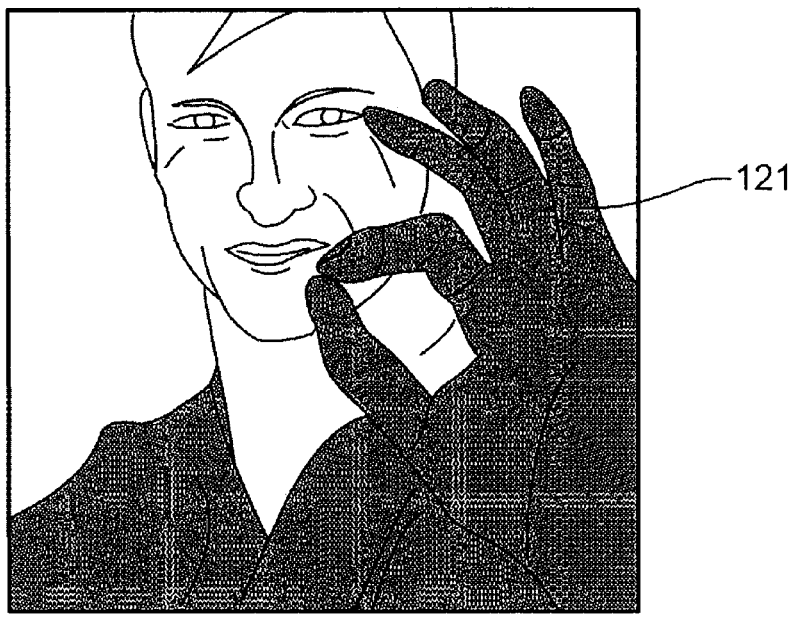
FIG. 8 is a diagram showing an example of a mask image generated by a mask image generation section.

FIG. 8 shows an example of the mask image. In the mask image shown in FIG. 8, a mask area 121 shown in black is an area having luminance values of the lower limit threshold value Th_L or more and the upper limit threshold value Th_H or less within the corresponding first captured image.

Further, the non-mask area shown in white in the mask image shown in FIG. 8 is an area that is lower than the lower limit threshold value Th_L or larger than the upper limit threshold value Th_H within the corresponding first captured image.

In a case where the luminance values of the pixels constituting the first captured image supplied from the camera 22 are equal to or larger than the lower limit threshold value Th_L and equal to or smaller than the upper limit threshold value Th_H, the mask image generation section 45 detects the pixels having such luminance values as pixels included in the mask area and converts each of those luminance values into the value 1.

Further, in a case where the luminance values of the pixels constituting the first captured image supplied from the camera 22 are smaller than the lower limit threshold value Th_L or larger than the upper limit threshold value Th_H, the mask image generation section 45 detects the pixels having such luminance values as pixels included in the non-mask area and converts each of those luminance values into the value 0.

It should be noted that the pixel value after the conversion is a value different from the luminance value, and represents a value set to 0 or 1.

Accordingly, the mask image generation section 45 generates the mask image that is constituted of the mask area 121 (shown in black) constituted of the pixels each having the value 1, and the non-mask area (shown in white) constituted of the pixels each having the value 0, and supplies the mask image to the shape extraction section 46.

Here, the lower limit threshold value Th_L and the upper limit threshold value Th_H are determined in the threshold value determination section 44. However, for example, one of the lower limit threshold value Th_L and the upper limit threshold value Th_H may be determined as a mask threshold value.

Specifically, for example, in a case where a maximum value of the luminance values of pixels constituting the first captured image supplied from the camera 22 to the mask image generation section 45 is a luminance value corresponding to a human skin (for example, luminance value 110 of FIG. 7), the threshold value determination section 44 may determine only a lower limit threshold value Th_L (for example, luminance value 55) as a mask threshold value.

In this case, in a case where the luminance values of the pixels constituting the first captured image supplied from the camera 22 are equal to or larger than the lower limit threshold value Th_L, the mask image generation section 45 detects the pixels having such luminance values as pixels included in the mask area and converts each of those luminance values into the value 1. Further, in a case where the luminance values of the pixels constituting the first captured image supplied from the camera 22 are smaller than the lower limit threshold value Th_L, the mask image generation section 45 detects the pixels having such luminance values as pixels included in the non-mask area and converts each of those luminance values into the value 0.

It should be noted that in a case where the threshold value determination section 44 determines only the upper limit threshold value Th_H as a mask threshold value, for example, it is assumed an occasion where the shape of the face 61 is extracted instead of the shape of the hand 62. At this time, for example, the threshold value determination section 44 determines the luminance 55 shown in FIG. 7 to be an upper limit threshold value Th_H as a mask threshold value.

Based on the mask image from the mask image generation section 45, the shape extraction section 46 extracts, for example, a shape area representing the shape of the hand of the user as an area corresponding to the mask area 121 within the mask image, from the face area 101 and the hand area 102 within the binarized skin image from the binarization section 42.

Specifically, for example, based on the mask area 121 and the non-mask area constituting the mask image from the mask image generation section 45, the shape extraction section 46 distinguishes relative distances from the light-emitting apparatus 23 between a part of the user (in this case, hand 62) whose luminance value is large because it is located closer to the light-emitting apparatus 23 (part of the user corresponding to the mask area 121) and a part of the user (in this case, face 61) whose luminance value is small because it is located far from the light-emitting apparatus 23 (part of the user corresponding to the non-mask area).

Then, the shape extraction section 46 distinguishes, for example, the part of the user (in this case, hand 62) whose luminance value is large because it is located closer to the light-emitting apparatus 23, based on the distinguished difference in relative distance from the light-emitting apparatus 23, and extracts a shape area (in this case, area representing the shape of the hand).

[Extraction of Shape of Hand]

Next, processing in which the shape extraction section 46 extracts the shape of the hand of the user or the like from the binarized skin image will be described in detail with reference to FIG. 9.

Figure 9:
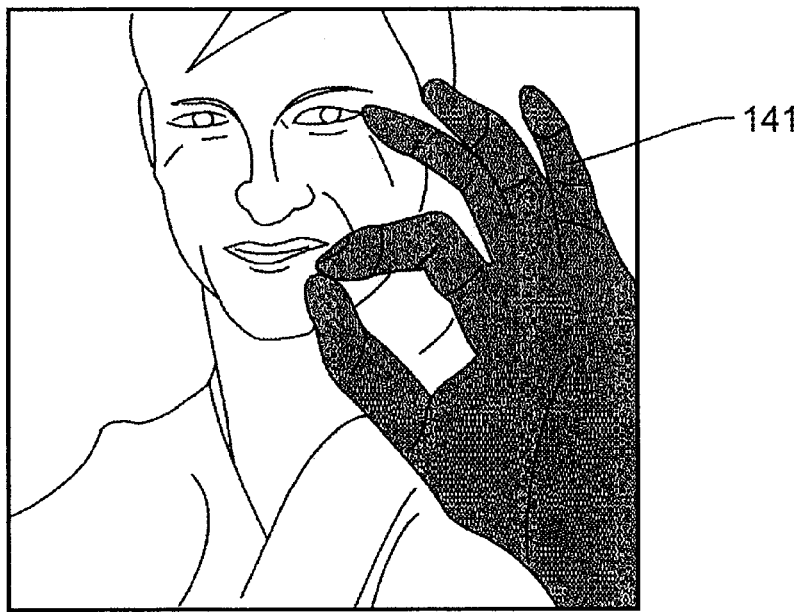
FIG. 9 is a diagram showing an example of an extracted image generated by a shape extraction section.

FIG. 9 shows a display example of the extracted image including the shape area that is extracted by the shape extraction section 46.

In the extracted image shown in FIG. 9, a shape area 141 represents a shape of a hand of the user.

The shape extraction section 46 multiplies the values of the pixels constituting the mask image supplied from the mask image generation section 45 and the respective values of corresponding pixels constituting the binarized skin image supplied from the binarization section 42.

Then, the shape extraction section 46 extracts, as the shape area 141, an area within the binarized skin image in which multiplication results are not 0, that is, out of the face area 101 and the hand area 102 within the binarized skin image (FIG. 5), a portion overlapping the mask area 121 within the mask image (FIG. 8).

Further, the shape extraction section 46 recognizes the shape of the hand of the user based on the extracted shape area 141, and performs processing corresponding to the recognition result.

It should be noted that the mask area 121 within the mask image shown in FIG. 8 includes the shirt that the user wears, in addition to the hand of the user.

However, since the face area 101 and the hand area 102 within the binarized skin image do not include the shirt that the user wears, the shape extraction section 46 can precisely extract the shape area 141 that represents only the shape of the hand without extracting the area representing the shape of the shirt.

[Description on Operation of Shape Extraction Processing]

Next, shape extraction processing in which the information processing system 1 extracts the shape of the hand of the user or the like will be described in detail.

Figure 10:
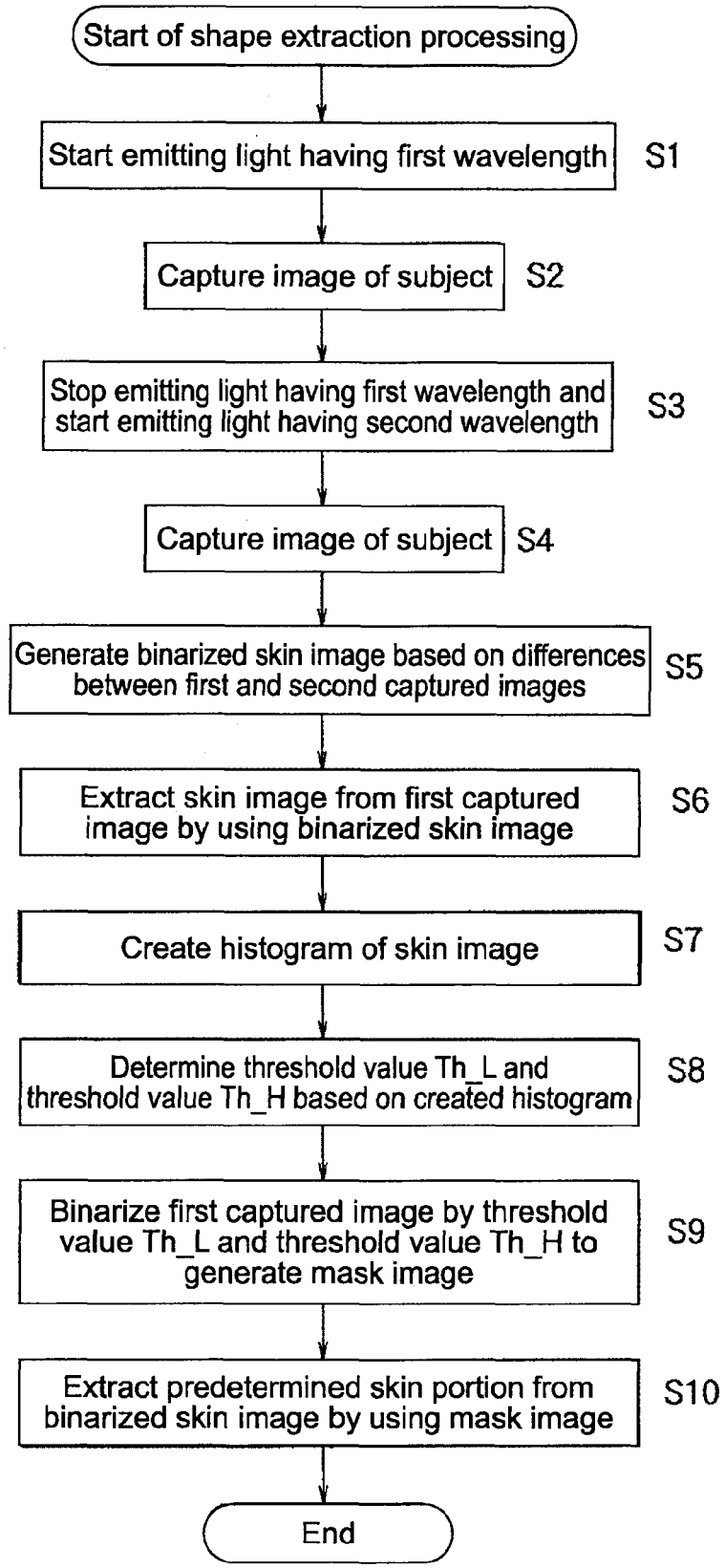
FIG. 10 is a flowchart for explaining shape extraction processing.

FIG. 10 is a flowchart for explaining the shape extraction processing. It should be noted that the shape extraction processing is repeatedly executed from a time when a power of the information processing system 1 is turned on.

Hereinafter, the shape extraction processing performed when the user is in front of the camera 22 will be described.

In Step S1, the controller 41 controls the LEDs 23*a* of the light-emitting apparatus 23 to start emitting the light having the first wavelength. It should be noted that in a case where the LEDs 23*b* are emitting light, the controller 41 stops the emission of the light of the LEDs 23*b* and then causes the LEDs 23*a* to start emitting light.

In Step S2, the camera 22 captures an image of the user irradiated with the light having the first wavelength, and supplies the resultant first captured image to the information processing apparatus 21.

In Step S3, the controller 41 controls the LEDs 23a of the light-emitting apparatus 23 to stop emitting the light having the first wavelength, and controls the LEDs 23b of the light-emitting apparatus 23 to start emitting the light having the second wavelength.

In Step S4, the camera 22 captures an image of the user irradiated with the light having the second wavelength, and supplies the resultant second captured image to the information processing apparatus 21.

In Step S5, the binarization section 42 generates a binarized skin image as shown in FIG. 5 based on the differences between luminance values of corresponding pixels of the first captured image and the second captured image that are supplied from the camera 22, and supplies the binarized skin image to the skin extraction section 43 and the shape extraction section 46.

In Step S6, the skin extraction section 43 extracts an area corresponding to the skin area (area in which skin portion of user is displayed) within the binarized skin image from the first captured image supplied from the camera 22, based on the binarized skin image supplied from the binarization section 42.

Then, the skin extraction section 43 generates a skin image including the extracted area and supplies the skin image to the threshold value determination section 44.

In Step S7, the threshold value determination section 44 creates a histogram of the skin image as shown in FIG. 7 based on the luminance values of the pixels constituting the skin image supplied from the skin extraction section 43.

In Step S8, the threshold value determination section 44 determines a luminance value at which the number of pixels becomes local minimum, as a lower limit threshold value Th_L, and determines a maximum luminance value as an upper limit threshold value Th_H, based on the created histogram of the skin image.

Then, the threshold value determination section 44 supplies the determined lower limit threshold value Th_L and upper limit threshold value Th_H, as mask threshold values, to the mask image generation section 45.

In Step S9, the mask image generation section 45 binarizes the first captured image supplied from the camera 22 based on the mask threshold values (lower limit threshold value Th_L and upper limit threshold value Th_H) supplied from the threshold value determination section 44 to generate a mask image as shown in FIG. 8, and supplies the mask image to the shape extraction section 46.

In Step S10, based on the mask image supplied from the mask image generation section 45, the shape extraction section 46 extracts, for example, an extraction area representing a shape of a hand of the user as an area corresponding to the mask area within the mask image, from the binarized skin image supplied from the binarization section 42.

Then, the shape extraction section 46 recognizes the shape of the hand by the extracted area thus extracted, performs processing corresponding to the recognition result, and outputs the processing result to a subsequent stage.

With the above processing, the shape extraction processing is terminated.

As described above, in the shape extraction processing, the mask image is generated based on the mask threshold values from the first captured image captured by one camera 22, and the shape of the hand of the user is extracted from the binarized skin image based on the generated mask image.

Accordingly, it is possible to reduce an amount of calculations necessary for generating the mask image and extract the shape of the hand of the user or the like with a smaller number of components, for example, as compared to a case where based on a plurality of captured images captured by a plurality of cameras, a distance image indicating a distance between the cameras and a hand of a user or the like is generated and the shape of the hand of the user is extracted using the distance image as a mask image.

Further, in the shape extraction processing, based on the difference between a distance from the camera 22 to the face of the user and a distance from the camera 22 to the hand, the mask image that includes the mask area 121 including only a skin portion of the hand, as a skin portion, without including the skin portion of the face, and the non-mask area is generated.

Accordingly, even when the hand area 102 including the hand to be extracted overlaps the face area 101 including the face as a skin portion other than the hand in the binarized skin image, the mask area 121 includes, as a skin portion, only the skin portion of the hand without including that of the face, with the result that only the hand area 102 can be extracted from the binarized skin image.

Consequently, it becomes possible to precisely extract the shape of the hand of the user.

Moreover, in the shape extraction processing, (light of) invisible near-infrared rays that cannot be seen by humans are emitted from the LEDs 23a and LEDs 23b.

Accordingly, since the user cannot visually recognize the light emitted from the LEDs 23a and LEDs 23b, the user does not feel uncomfortable due to bright light emitted from the LEDs 23a and LEDs 23b.

Moreover, the diffuser plate 23c is provided in front of the LEDs 23a and LEDs 23b in the light-emitting apparatus 23 of the information processing system 1.

With this, the invisible light emitted from the LEDs 23a and LEDs 23b is uniformly diffused. Therefore, uniform light without unevenness caused by an amount of light is applied to a subject.

Accordingly, reflected light of the invisible light applied to the subject is received by the camera 22 as uniform light without unevenness caused by an amount of light, with the result that the first and second captured images without unevenness caused by the amount of light can be obtained by the camera 22.

Accordingly, since the first and second captured image without unevenness caused by the amount of light are used for extracting the shape of the hand or the like in the information processing system 1, it becomes possible to extract the shape of the hand or the like more precisely than a case where first and second captured images with unevenness caused by the amount of light are used, for example.

It should be noted that in the information processing system 1, it is desirable to extract the shape of the hand in, for example, about 80 [ms] from a start of the shape extraction processing so that the shape of the hand after being changed can be recognized each time the user changes the shape of the hand.

More suitably, for example, it is desirable to extract the shape of the hand within, for example, about 80 [ms] from the start of the shape extraction processing. This is because the user hardly feels stress when operating, if the processing time for extracting the shape of the hand is within 80 [ms], which has been revealed by the experiments or the like performed in advance.

As described above, in the present invention of the subject application, for example, the shape of the hand is extracted by extremely simple processing of comparing a value obtained by calculating and normalizing the difference L1−L2 with a threshold value, and therefore the processing time within 80

[ms] can be easily realized even when a relatively low-cost and low-speed CPU (Central Processing Unit) is used.

In contrast to this, in a case where a skin is detected using the conventional pattern matching method, it is necessary to perform extremely complicated processing of comparing a plurality of shape images learned in advance with a plurality of areas on a captured image. Therefore, it becomes difficult to make the processing time within 80 [ms] even when an expensive and high-speed CPU is used.

As described above, according to the present invention of the subject application, since the processing time within 80 [ms] can be easily realized even when a relatively low-cost and low-speed CPU is used, it is possible to suppress manufacturing costs and also perform processing of extracting the shape of the hand, or the like rapidly without causing the user to feel stress.

In this embodiment described above, for example, there has been described that even when the face 61 overlaps the hand 62 as skin area, the shape of the hand 62 can be precisely extracted. However, for example, in a case where the user wears a short-sleeved shirt or the like, there may also be a case where an arm or the like overlaps in addition to the face 61 and the hand 62 of the user.

Figure 11:
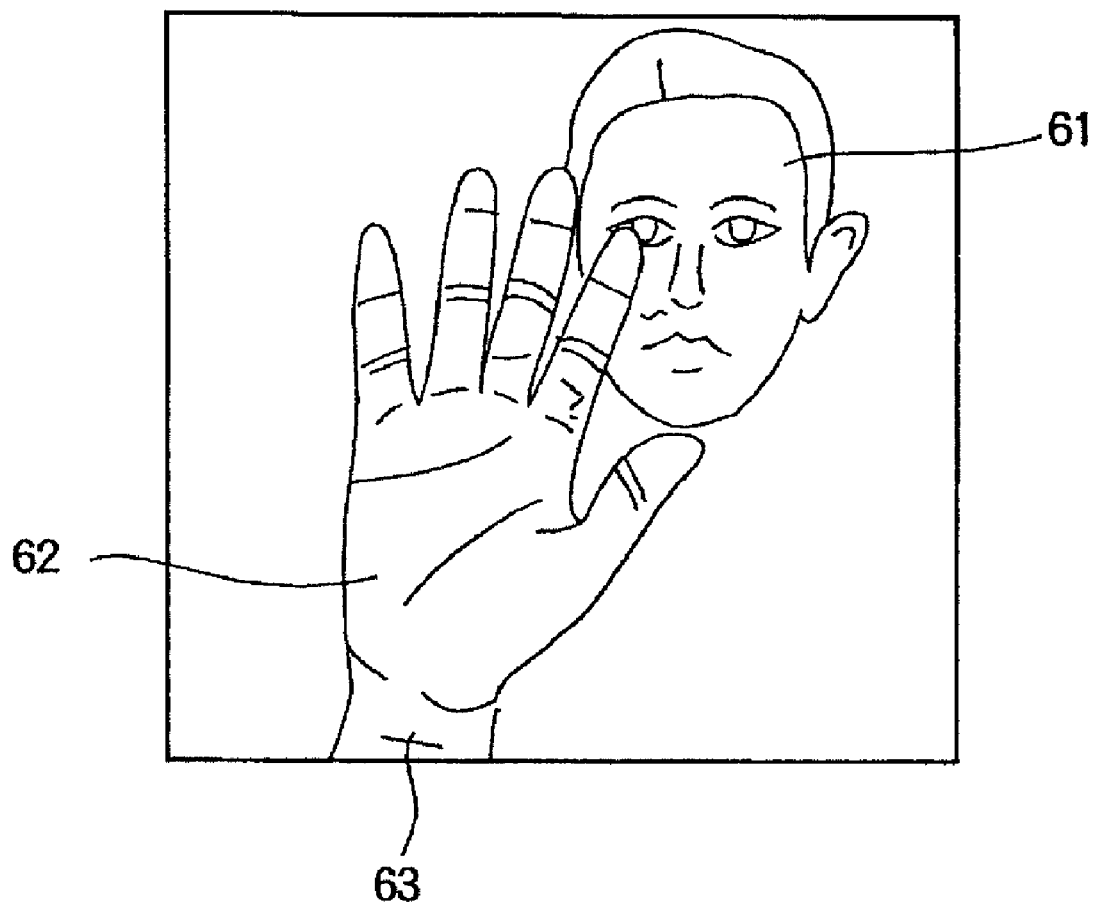
FIG. 11 is a diagram showing a second example of the skin image extracted by the skin extraction section.
Figure 12:
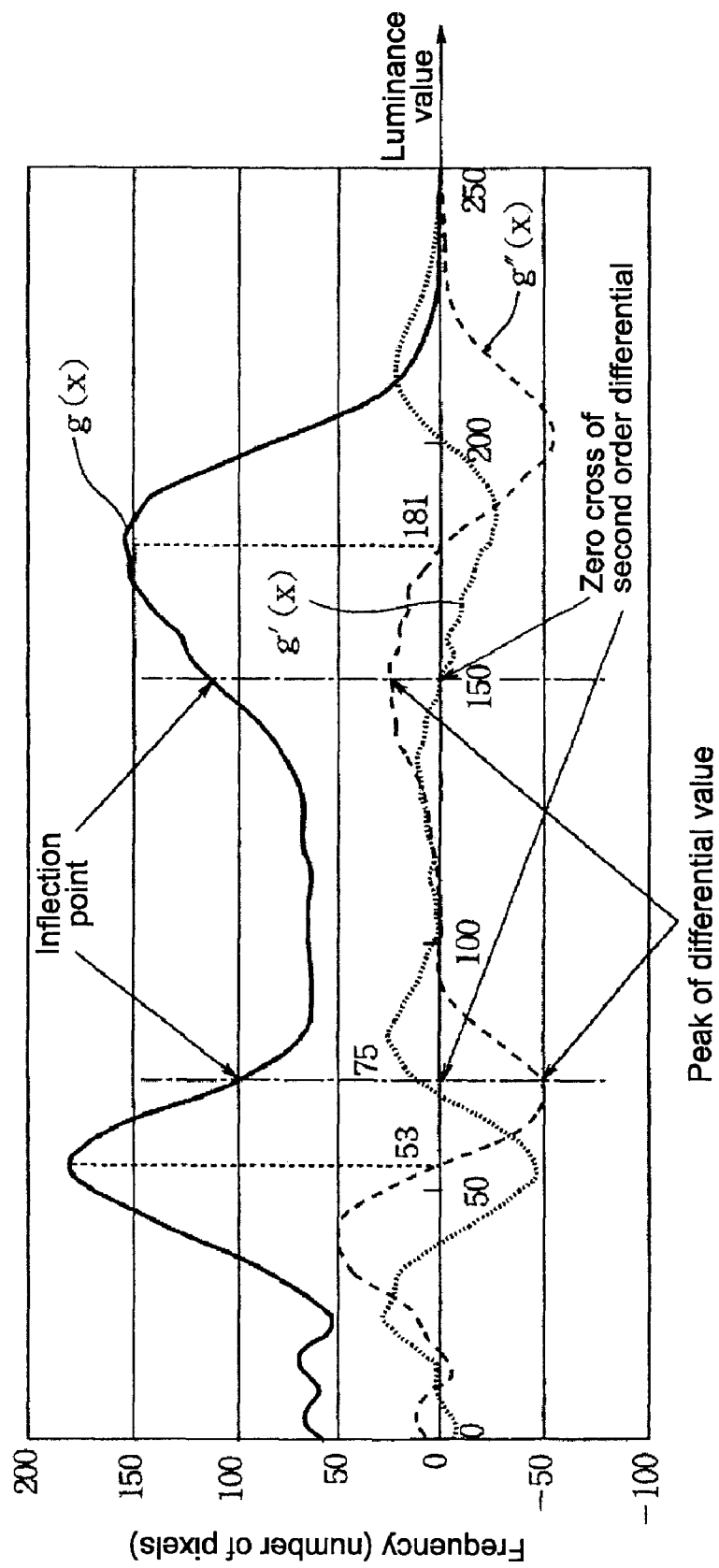
FIG. 12 is a diagram showing a second example of the histogram of the skin image.

Specifically, for example, a skin image in which an arm 63 is displayed in addition to the face 61 and the hand 62 as shown in FIG. 11 is extracted by the skin extraction section 43, the threshold value determination section 44 generates a histogram as shown in FIG. 12.

Next, FIG. 12 shows an example of a histogram generated based on the skin image as shown in FIG. 11.

In the face 61, the hand 62, and the arm 63 displayed in the skin image shown in FIG. 11, a distance from the light-emitting apparatus 23 to the hand 62 is the first closest (shortest), a distance from the light-emitting apparatus 23 to the arm 63 is the second closest (shortest), and a distance from the light-emitting apparatus 23 to the face 61 is the third closest (shortest).

Therefore, in the histogram of the skin image shown in FIG. 11, as indicated on the uppermost side of FIG. 12 (indicated by solid line), the pixels having a luminance value 0 to a luminance value 75 are pixels corresponding to the face 61 of the user, the pixels having a luminance value 76 to a luminance value 150 are pixels corresponding to the arm 63 of the user, and the pixels having a luminance value 151 to a luminance value 250 are pixels corresponding to the hand 62 of the user.

For example, the threshold value determination section 44 determines a lower limit threshold value Th_L based on a function y=g(x) representing the histogram shown in FIG. 12 (indicated by solid line).

Incidentally, in the histogram shown in FIG. 12, because the arm 63 exists between the face 61 and the hand 62, the histogram in the luminance values 76 to 150 corresponding to the arm 63 becomes flat. Therefore, as in the histogram shown in FIG. 7, such a clear local minimum that distinguishes the face 61 from the hand 62 (luminance value 55 in FIG. 7) does not exist. Therefore, it is impossible to determine a lower limit threshold value Th_L as in the case described with reference to FIG. 7.

In this regard, based on the generated histogram, the threshold value determination section 44 judges the shape of the histogram, and determine a lower limit threshold value Th_L or the like in accordance with the judged shape of the histogram in a different method (for example, method described in FIG. 7, method to be described with reference to FIG. 12, or the like).

Hereinafter, a case where the threshold value determination section 44 determines, for example, a lower limit threshold value Th_L or the like based on the histogram shown in FIG. 12 will be described.

Here, according to the experiments performed by the inventor of the present invention, it is found that a luminance value representing a boundary between a luminance value corresponding to the face 61 and a luminance value corresponding to the arm 63 (in this case, luminance value in the vicinity of value 75), and a luminance value representing a boundary between a luminance value corresponding to the arm 63 and a luminance value corresponding to the hand 62 (in this case, luminance value in the vicinity of value 150) become an inflection point of a function g(x), that is, x at a time when a first derivative g'(x) becomes a local maximum or a local minimum.

Accordingly, for example, the threshold value determination section 44 differentiates the generated function g(x) once to generate the first derivative g'(x). The threshold value determination section 44 calculates x=x0 at a time when the first derivative g'(x) is a local maximum or a local minimum, that is, x=x0 at a time when a function g'(x) changes from a positive value to a negative value, or from a negative value to a positive value.

Further, the threshold value determination section 44 calculates, for example, two x1 and x2 (x1<x2) at a time when the function g(x) becomes a local maximum (for example, x1=53, x2=181). Then, the threshold value determination section 44 determines, as a lower limit threshold value Th_L, out of x=x0 at a time when the first derivative g'(x) is a local maximum or a local minimum, a value that is x=x0 smaller than x=x2, and is closest to the x=x2 (for example, x0 at which x2−x0 becomes smallest) (in this case, luminance value 150).

Further, for example, the threshold value determination section 44 determines, for example, an upper limit threshold value Th_H as a maximum value of the luminance values in the histogram shown in FIG. 12 (in this case, luminance value 250).

The lower limit threshold value Th_L and upper limit threshold value Th_H thus determined are used for generating a mask image used when the shape of the hand 62 is extracted.

It should be noted that the threshold value determination section 44 may determine, as a lower limit threshold value Th_L, out of x=x0 at a time when the first derivative g'(x) is a local maximum or a local minimum, a value that is x=x0 larger than x=x1 and is closest to the x=x1 (for example, x0 at which x0−x1 becomes smallest) (in this case, luminance value 75), and determine, as an upper limit threshold value Th_H, a maximum value of the luminance values in the histogram as shown in FIG. 12 (in this case, luminance value 250).

The lower limit threshold value Th_L and upper limit threshold value Th_H thus determined are used for generating a mask image used when the shape formed by the hand 62 and the arm 63 is extracted.

It should be noted that, for example, in a case of determining the lower limit threshold value Th_L and upper limit threshold value Th_H used for generating a mask image used when the shape of the arm 63 is extracted, the threshold value determination section 44 determines the lower limit threshold value Th_L to be a luminance value 75, and the upper limit threshold value Th_H to be a luminance value 150.

When the lower limit threshold value Th_L and the upper limit threshold value Th_H are determined as described with reference to FIGS. 11 and 12, it is possible to precisely extract, for example, the shape of the hand 62 or the like even when the face 61, the hand 62, and the arm 63 partially overlap, for example.

Incidentally, in a case of calculating x=x0 at which the first derivative g'(x) is a local maximum or a local minimum, the threshold value determination section 44 can differentiate the first derivative g'(x) to calculate a second derivative g"(x), and calculate a point x at which a second derivative g"(x)=0 as x=x0. This is due to the fact that the point x at which the second derivative g"(x)=0 coincides with x=x0 at which the first derivative g'(x) is a local maximum or a local minimum, that is, an inflection point of the function g(x).

In this case, the threshold value determination section 44 calculates an inflection point x=x0 at which the second derivative g"(x)=0, with the result that it becomes possible to calculate x=x0 more easily than the case where x=x0 is calculated based on the first derivative g'(x).

Further, for example, if the skin extraction section 43 supplies the extracted skin image to the shape extraction section 46, the shape extraction section 46 can detect a corresponding area that corresponds to the extracted shape area from the skin image supplied from the skin extraction section 43, and extract, as one representing distribution of luminance values of pixels constituting the detected corresponding area, for example based on a histogram of the corresponding area, only an area corresponding to one located at a position closest to the light-emitting apparatus 23 out of ones displayed in the corresponding area.

Figure 13:
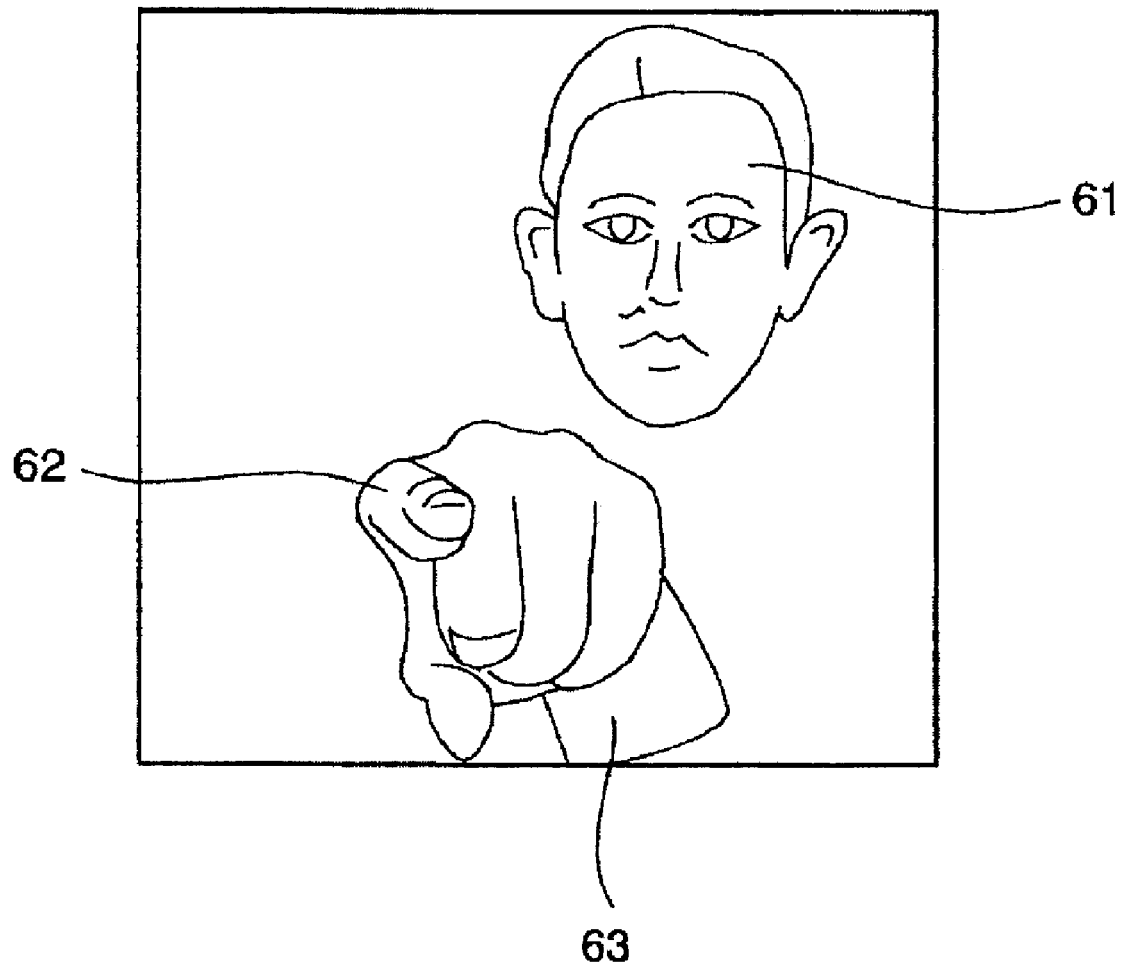
FIG. 13 is a diagram showing a third example of the skin image extracted by the skin extraction section.

Specifically, for example, in a case where the skin extraction section 43 extracts a skin image as shown in FIG. 13, the shape extraction section 46 can extract only an area corresponding to a tip of an index finger in the area of the hand 62. It should be noted that in FIG. 13, the tip of the index finger of the hand 62 is located at a position closest to the light-emitting apparatus 23.

Figure 14:
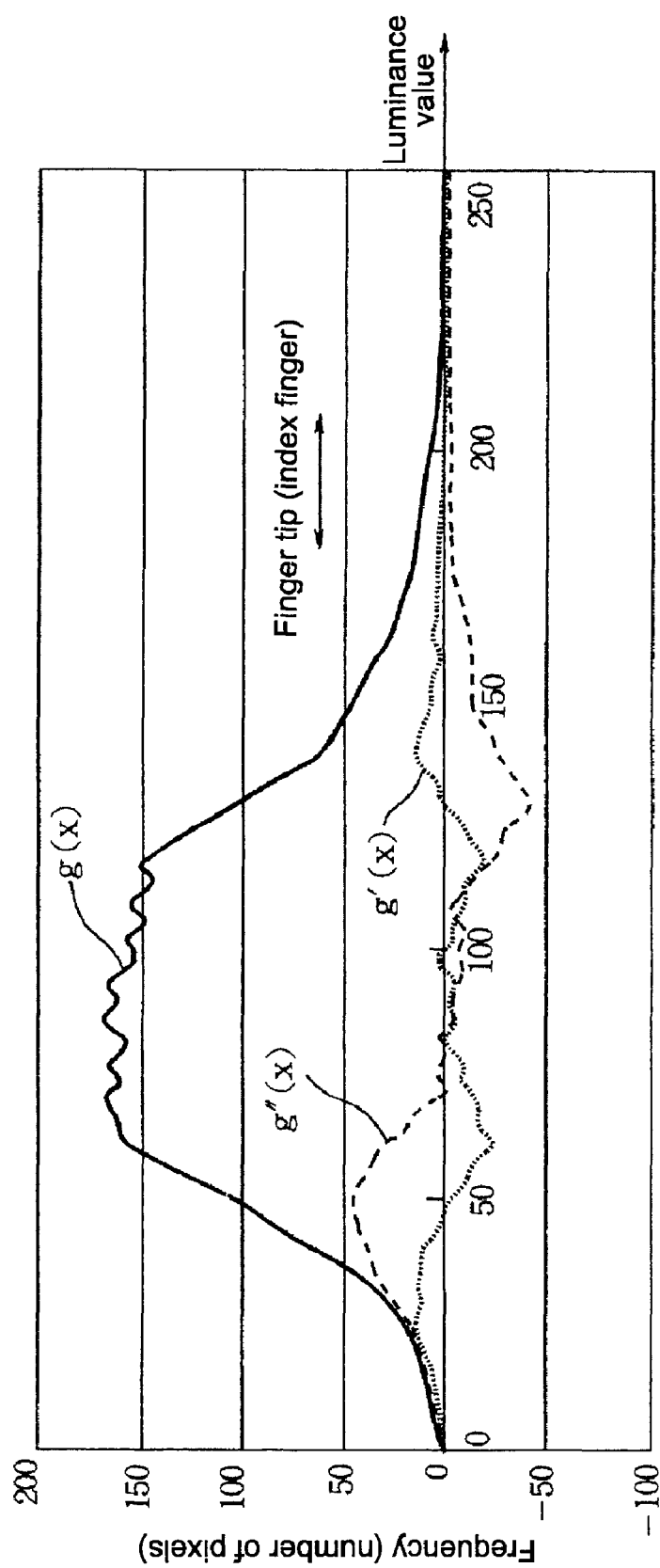
FIG. 14 is a diagram showing a third example of the histogram of the skin image.

Next, FIG. 14 shows an example of a histogram of the corresponding area.

It should be noted that in the histogram shown on the uppermost side of FIG. 14 (indicated by solid line), for example, a histogram on only luminance values of pixels constituting the corresponding area in which the hand 62 is displayed is shown. Except for that, it is the same as FIG. 12.

For example, the skin extraction section 43 generates a skin image as shown in FIG. 13, based on the binarized skin image supplied from the binarization section 42 and the first captured image supplied from the camera 22, and supplies the skin image to the shape extraction section 46 in addition to the threshold value determination section 44. Then, the shape extraction section 46 detects a corresponding area that corresponds to the extracted shape area from the skin image supplied from the skin extraction section 43, and generates a histogram as shown in FIG. 14 based on the luminance values of the pixels constituting the detected corresponding area. The shape extraction section 46 can extract a range having high luminance values out of the luminance values constituting the generated histogram, as an end area representing the tip of the index finger, from (the corresponding area of) the skin image supplied from the skin extraction section 43.

In this case, out of respective parts of the skin of the user, a distance between the light-emitting apparatus 23 and the tip of the index finger is closest. Therefore, in the histogram shown in FIG. 14, the luminance value corresponding to the tip of the index finger is highest.

It should be noted that an area of the tip portion of the index finger is relatively small. Therefore, a corresponding portion in the histogram of FIG. 14 does not have an extremum and is flat similarly to the portion corresponding to the arm 63 of FIG. 12.

For example, the shape extraction section 46 extracts an area constituted of pixels corresponding to luminance values in a top n[%] (for example, n=10) of large luminance values out of luminance values constituting the histogram, as an end area in which a tip (end) of the index finger of the user is displayed, from the skin image supplied from the skin extraction section 43. It should be noted that n[%] is determined in accordance with a portion to be extracted or the like by experiments or the like previously performed.

Then, the shape extraction section 46 performs corresponding processing in accordance with (a shape or the like of) the extracted end area.

Incidentally, a ratio d2/d1 of a relative distance d1 from the light-emitting apparatus 23 to the tip of the index finger of the user and, for example, a relative distance d2 from the light-emitting apparatus 23 to the base portion of the index finger of the user is increased as a distance between the light-emitting apparatus 23 and the hand of the user becomes short.

Specifically, as a distance between the light-emitting apparatus 23 and the hand of the user is short, a difference between the distance d1 and the distance d2 becomes relatively large. Therefore, in a case where the distance between the light-emitting apparatus 23 and the hand of the user is relatively short, as compared to the case where the distance between the light-emitting apparatus 23 and the hand of the user is long, for example, the luminance value at the tip of the index finger of the user and the luminance values at the base portion of the index finger of the user are largely different, that is, a change in luminance value due to a distance is large.

In this way, there can be obtained a histogram in which as the change in luminance value due to a distance becomes large, the number of pixels at the tip portion of the index finger is small but the luminance values of those pixels are considerably large as compared to the luminance values of the pixels at the base portion of the index finger (for example, it becomes luminance values in the top n[%]) as shown in FIG. 13. Therefore, it is possible to extract the tip portion of the index finger of the user relatively precisely.

It should be noted that in the description above, the shape extraction section 46 detects a corresponding area corresponding to the extracted shape area from the skin image of the skin extraction section 43, but a target of an image in which a corresponding area is detected is not limited thereto.

Specifically, for example, the first captured image may be supplied to the shape extraction section 46 from the camera 22, and then a corresponding area may be detected with the first captured image as a target. In addition, for example, a second captured image may be set as a target. In other words, the shape extraction section 46 may have any image as a target as long as a subject that is the same as the subject displayed in the first or second captured image is displayed at the same position.

Further, in the description above, the skin extraction section 43 supplies the extracted skin image to the shape extraction section 46. However, the shape extraction section 46 may supply the extracted shape area to the skin extraction section 43, and the skin extraction section 43 may detect a corresponding area that corresponds to the shape area supplied from the shape extraction section 46, from the extracted skin image, to thereby extract only an area corresponding to one at a position closest to the light-emitting apparatus 23 out of ones displayed in the corresponding area.

Further, in a case where, for example, in the threshold value determination section 44, the histogram generated based on the skin image from the skin extraction section 43 apparently shows the luminance values corresponding to the tip of the index finger as shown in FIG. 14 (for example, as shown in FIG. 14, the luminance values of the histogram corresponding to the tip of the index finger are flat), an area corresponding to the luminance values in the top n[%], a mask threshold value set as a mask area, can be determined.

Specifically, for example, in a case where the generated histogram is a histogram as shown in FIG. 14 (particularly, portion with high luminance values), the threshold value determination section 44 determines a minimum luminance value as a lower limit threshold value Th_L, out of luminance values included in the top n[%], and determines out of the luminance value constituting the histogram, a maximum luminance value as an upper limit threshold value Th_H. In this case, the shape extraction section 46 extracts the shape of the tip portion of the index finger located closest to the light-emitting apparatus 23, from the binarized skin image supplied from the binarization section 42, out of the skin areas of the user.

Next, the information processing system 1 can perform corresponding processing so as to recognize a movement or the like of the hand of the user in a direction of the light-emitting apparatus while using the fact that the luminance values of the skin area of the user become large at a position closer to the light-emitting apparatus 23, and that the luminance values become small at a position far from the light-emitting apparatus 23.

For example, after shifting a pointer on a display apparatus in xy directions in conjunction with vertical and horizontal movements of the hand of the user (position (x, y) of the hand that changes in accordance with movements) to select one content of a destination to which the pointer is shifted out of a plurality of contents on a screen, it is possible to perform a so-called click operation of a mouse, that is, a determination operation, in conjunction with the movement in a front-back direction of the hand of the user, that is, in a direction of the light-emitting apparatus 23 (z direction). However, in a case where the hand is moved in the z direction, the hand is moved also in the xy directions, and there arises a problem that a desired content cannot be selected. However, the following method allows the problem to be solved, for example.

Specifically, for example, the shape extraction section 46 extracts a corresponding area (for example, area in which hand is displayed) that corresponds to the extracted shape area (for example, area in which the shape of the hand is represented), from the first captured image obtained by the camera 22 capturing an image. Then, the shape extraction section 46 detects a position of the hand based on the luminance values of the pixels constituting the extracted corresponding area. It should be noted that the shape extraction section 46 can adopt a second captured image, as a target from which a corresponding area is extracted, in addition to the first captured image. In other words, the shape extraction section 46 can extract a corresponding area from a display image (including first and second captured images), as a target, in which a subject that is the same as the subject displayed in the first or second captured image is displayed at the same position.

Figure 15:
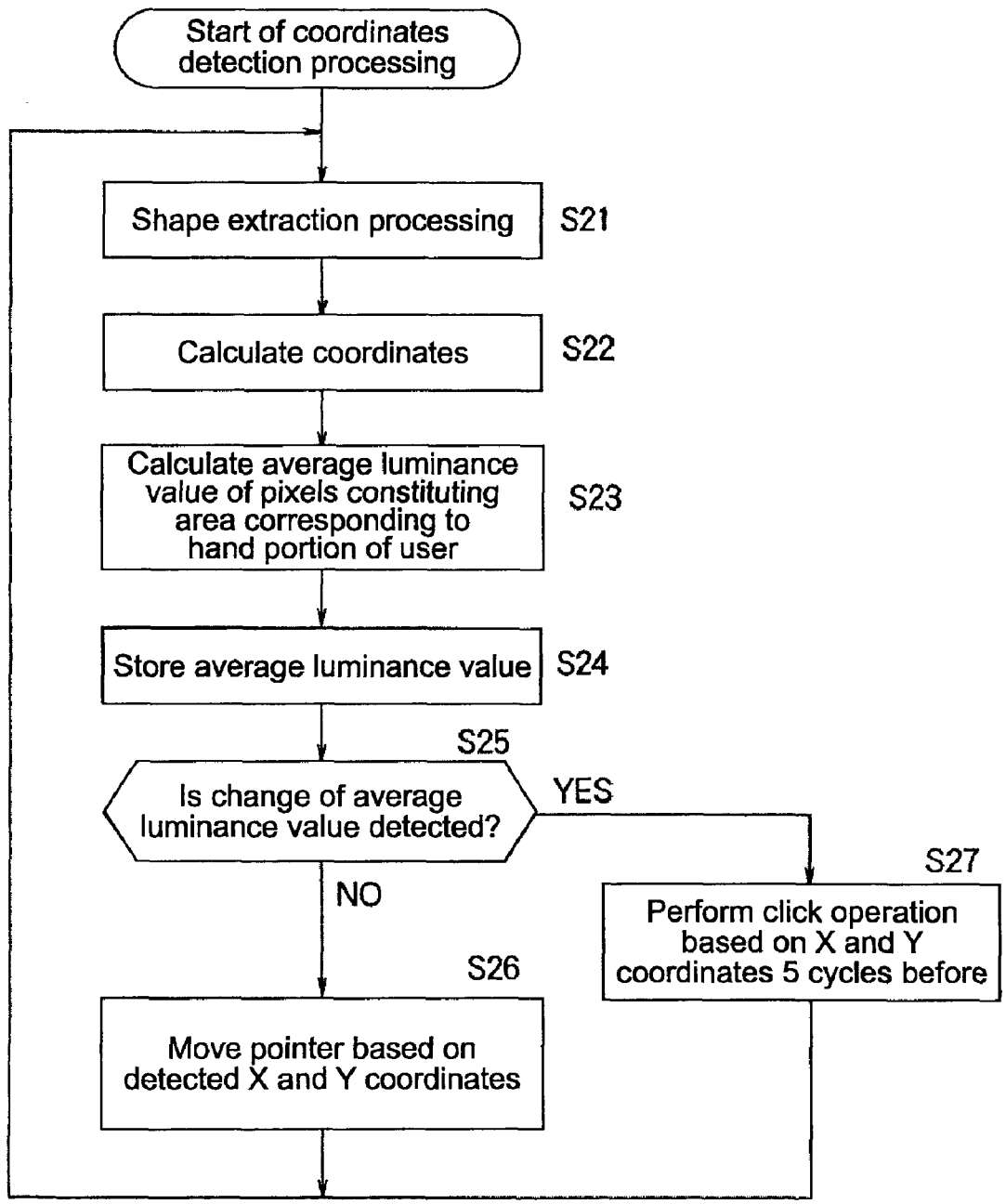
FIG. 15 is a flowchart for explaining coordinates detection processing.

Next, coordinates detection processing performed by the shape extraction section 46 will be descried with reference to FIG. 15.

In Step S21, the controller 41 or the shape extraction section 46, the camera 22, and the light-emitting apparatus 23 of the information processing apparatus 21 perform the shape extraction processing with reference to FIG. 10. With this, the shape extraction section 46 extracts a shape area from the binarized skin image supplied from the binarization section 42 based on the mask image supplied from the mask image generation section 45.

In Step S22, the shape extraction section 46 detects coordinates $(x, y)_t$ based on the extracted shape area. Specifically, for example, the shape extraction section 46 calculates a barycenter (x, y) of the extracted shape area as coordinates $(x, y)_t$.

In Step S23, the shape extraction section 46 detects a corresponding area that corresponds to the extracted shape area (for example, area in which hand is displayed) in the entire area on the first captured image from the camera 22. It should be noted that the first captured image is supplied to the shape extraction section 46 from the camera 22.

The shape extraction section 46 calculates an average value (average luminance value) $Y_t$ of luminance values of the pixels constituting that corresponding area, based on the luminance values of the pixels constituting the detected corresponding area.

In Step S24, the shape extraction section 46 associates the calculated coordinates $(x, y)_t$ with the average luminance value $Y_t$ in the t-th order of calculation, and stores them in a built-in memory.

In Step S25, the shape extraction section 46 reads out an average luminance value $Y_{t-1}$ stored in the previous Step S24, out of average luminance values $Y_1$ to $Y_{t-1}$ stored in the built-in memory. It should be noted that in a case where an average luminance value $Y_{t-1}$, that is, $Y_1$ is not yet stored in the built-in memory, the shape extraction section 46 skips Step S25 and forwards the processing to Step S26.

In Step S25, the shape extraction section 46 judges whether a relative distance from the light-emitting apparatus 23 to a subject is largely changed, based on whether the large and small of the calculated average luminance value $Y_t$, that is, for example, an absolute value of a difference $Y_t$-$Y_{t-1}$ obtained by subtracting the average luminance value $Y_{t-1}$ read out from the built-in memory from the calculated average luminance value $Y_t$ is smaller than a predetermined threshold value.

It should be noted that the shape extraction section 46 can also judge, based on whether the difference $Y_t$-$Y_{t-1}$ is positive or negative, whether the distance is changed such that the relative distance from the light-emitting apparatus 23 to a subject is shorter or larger.

In Step S25, in a case of judging that the relative distance from the light-emitting apparatus 23 to the subject is not largely changed, the shape extraction section 46 forwards the processing to Step S26. In Step S26, the shape extraction section 46 controls display of a display apparatus (not shown), based on the calculated coordinates $(x, y)_t$. Specifically, for example, the shape extraction section 46 shifts a pointer displayed on a screen of the display apparatus to a position corresponding to the calculated coordinates $(x, y)_t$.

After the termination of the processing of Step S26, the processing returns to Step S21, and the same processing will be performed thereafter.

In addition, in Step S25, in a case of judging that the relative distance from the light-emitting apparatus 23 to the subject is largely changed, the shape extraction section 46 forwards the processing to Step S27.

In Step S27, the shape extraction section 46 assumes that a so-called click operation is performed, as coordinates $(x, y)_{t-k}$ stored in the built-in memory, at a position on the screen of the display apparatus (not shown), the position corresponding to, for example, coordinates $(x, y)_{t-5}$, and performs processing based on the click operation. The processing returns to Step S21, and the same processing will be performed thereafter.

It should be noted that this coordinates detection processing is terminated when a power of the information processing system 1 is turned off, or the like.

As described above, in the coordinates detection processing, the shape extraction section 46 judges whether the relative distance from the light-emitting apparatus 23 to the subject is largely changed based on the average luminance value $Y_t$, with the result that a gesture such as a click operation by the user can also be recognized.

Further, in the coordinates detection processing, in a case of judging that a click operation by the user is performed, the shape extraction section 46 performs, in Step S27, processing based on the click operation, assuming that a click operation has been made at a position on the screen of the display apparatus (not shown), the position corresponds to, for example, coordinates $(x, y)_{t-5}$.

Therefore, for example, in a case where the user moves his/her own hand or the like close to the camera 22 by a click operation, even when at least one of x and y of the coordinates $(x, y)_t$ is changed, it is treated that a click operation that is based on x and y obtained before the change has been made. Accordingly, as compared to a case where the coordinates $(x, y)_t$ calculated by the shape extraction section 46 are used as they are, it becomes possible to precisely recognize a click operation made by the user.

It should be noted that in the coordinates detection processing, the processing described above may be performed by adopting, as a shape area, an area representing a shape that is formed by the hand and the arm, in addition to the area representing the shape of the hand.

Further, in the coordinates detection processing, the shape extraction section 46 may extract only a tip (end) portion of the index finger out of the shape of the hand extracted as a shape area as described with reference to FIGS. 13 and 14, and judge whether the relative distance from the light-emitting apparatus 23 to the tip portion is largely changed based on the average luminance value $Y_t$ of luminance values of pixels constituting the area in which the extracted tip portion is displayed.

Further, since the average luminance value $Y_t$ is used in the coordinates detection processing, it is possible to certainly calculate an average luminance value $Y_t$ even if an area corresponding to the shape area (for example, an area in which the hand 62 is displayed) is changed, the area being extracted by the shape extraction section 46.

Therefore, for example, it is possible to precisely extract, for example, a movement of the hand 62 (for example, click operation etc.) with respect to a direction in which the light-emitting apparatus 23 is present.

It should be noted that in Step S23, the shape extraction section 46 calculates the average luminance value $Y_t$ of the luminance values of the pixels constituting the corresponding area based on the luminance values of the pixels constituting the extracted corresponding area, but it may be configured to use others, for example, a maximum value, a minimum value, a dispersion value, or the like of the pixels constituting that corresponding area, instead of the average luminance value $Y_t$.

Further, for example, in Step S25, the shape extraction section 46 judges whether the relative distance from the light-emitting apparatus 23 to the subject is largely changed, based on whether the absolute value of the difference $Y_t - Y_{t-1}$ is smaller than a predetermined threshold value. In addition thereto, for example, it may be possible to prepare in advance an average luminance value $Y_s$ obtained at a predetermined distance from the light-emitting apparatus 23 and compare the calculated average luminance value $Y_t$ with the average luminance value $Y_s$ prepared in advance, to thereby detect a change in relative distance from the light-emitting apparatus 23, with a position at a predetermined distance from the light-emitting apparatus 23 being set as a reference position, based on the distance from the reference position.

2. Modified Example

In the shape extraction processing described above, the skin image is extracted and the mask threshold values (lower limit threshold value Th_L and upper limit threshold value Th_H) are determined based on the histogram of the extracted skin image through the processing of Steps S6 to S8 every time the shape extraction processing is performed, but the shape extraction processing is not limited thereto.

Specifically, for example, in the shape extraction processing, the mask threshold values previously determined in Steps S6 to S8 may be used as they are when the shape extraction processing is performed.

In this case, since the processing in Steps S6 to S8 can be omitted, it is possible to rapidly extract the shape of the hand or the like by the shape extraction processing.

Further, by performing the same processing as the processing in Steps S6 to S8 before performing the shape extraction processing to determine mask threshold values in advance, it is also possible to omit the processing in Steps S6 to S8 in the shape extraction processing.

It should be noted that as the processing of determining the mask threshold values in advance before performing the shape extraction processing, it is additionally possible to determine the mask threshold values based on an average value of luminance values of pixels constituting a part of the hand area of the user, for example.

[Method of Determining Mask Threshold Values]

Next, FFT (Fast Fourier Transform) threshold value determination processing in which the threshold value determination section 44 determines mask threshold values based on an average value of luminance values of pixels constituting the hand area of the user will be described with reference to FIG. 16.

Figure 16:
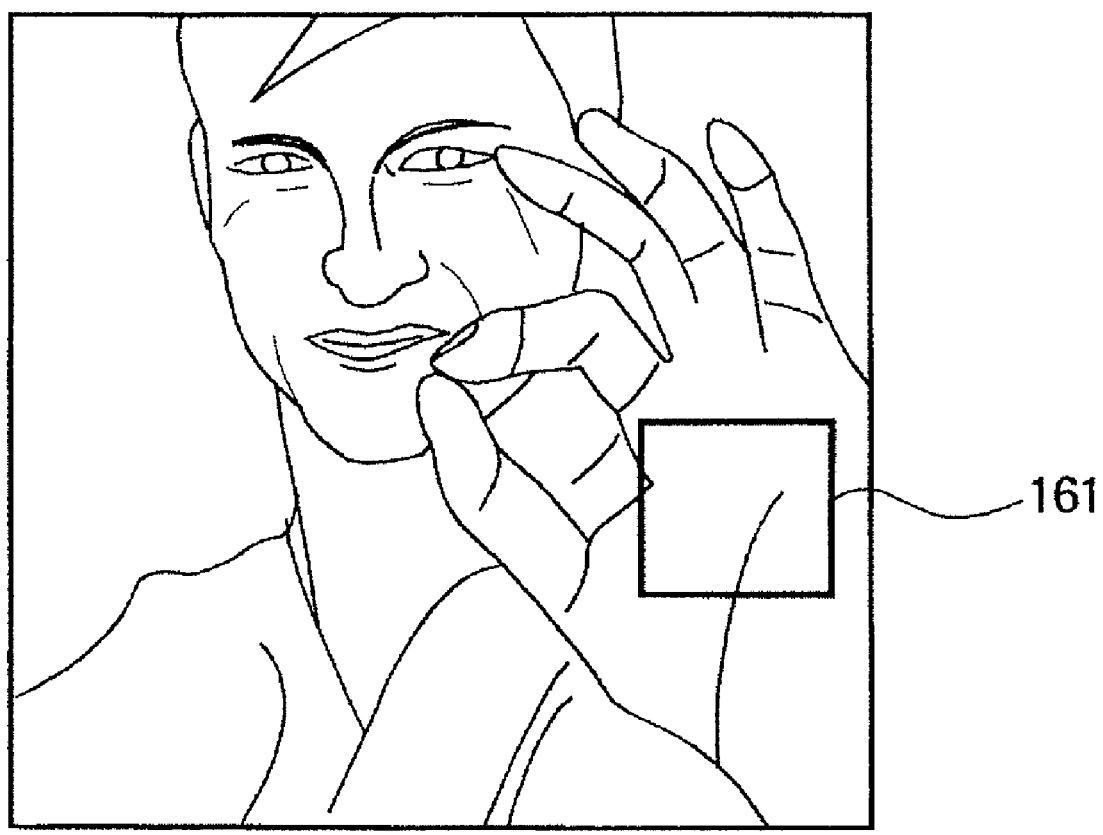
FIG. 16 is a diagram showing the first captured image that is used in FFT threshold value determination processing.

FIG. 16 shows an example of a first captured image obtained by capturing an image of the user irradiated with light having a wavelength of 870 [nm].

It should be noted that when the FFT threshold value determination processing is performed, the threshold value determination section 44 is supplied, from the camera 22, with a plurality of first captured images obtained by capturing images of a user waving the hand by the camera 22.

The threshold value determination section 44 performs the FFT processing on the plurality of first captured images and detects a part of a hand area within the first captured image, the part moving at a constant frequency.

Then, the threshold value determination section 44 calculates an average value ave_L of luminance values of pixels constituting a rectangular area 161 that is a part of the detected hand area.

Further, the threshold value determination section 44 determines a value ave_L−a obtained by subtracting an adjustment value a from the average value ave_L as a lower limit threshold value Th_L, and a value ave_L+b obtained by adding an adjustment value b from the average value ave_L as an upper limit threshold value Th_H.

It should be noted that the adjustment values a and b are values used for adjusting the average value ave_L and determining the lower limit threshold value Th_L and the upper limit threshold value Th_H.

The adjustment values a and b are variables calculated in accordance with intensities of light (amounts of light) emitted from the LEDs 23a and LEDs 23b, a distance from the camera 22 to the user, and light sensitivity of a CCD (Charge Coupled Device Image Sensor) used in the camera 22, but the variables are experimentally calculated in actuality in many cases.

[Description on Operation by FFT Threshold Value Determination Processing]

Next, the FFT threshold value determination processing in which the threshold value determination section 44 determines mask threshold values based on the average value of the luminance values of the pixels constituting the hand area of the user will be described.

Figure 17:
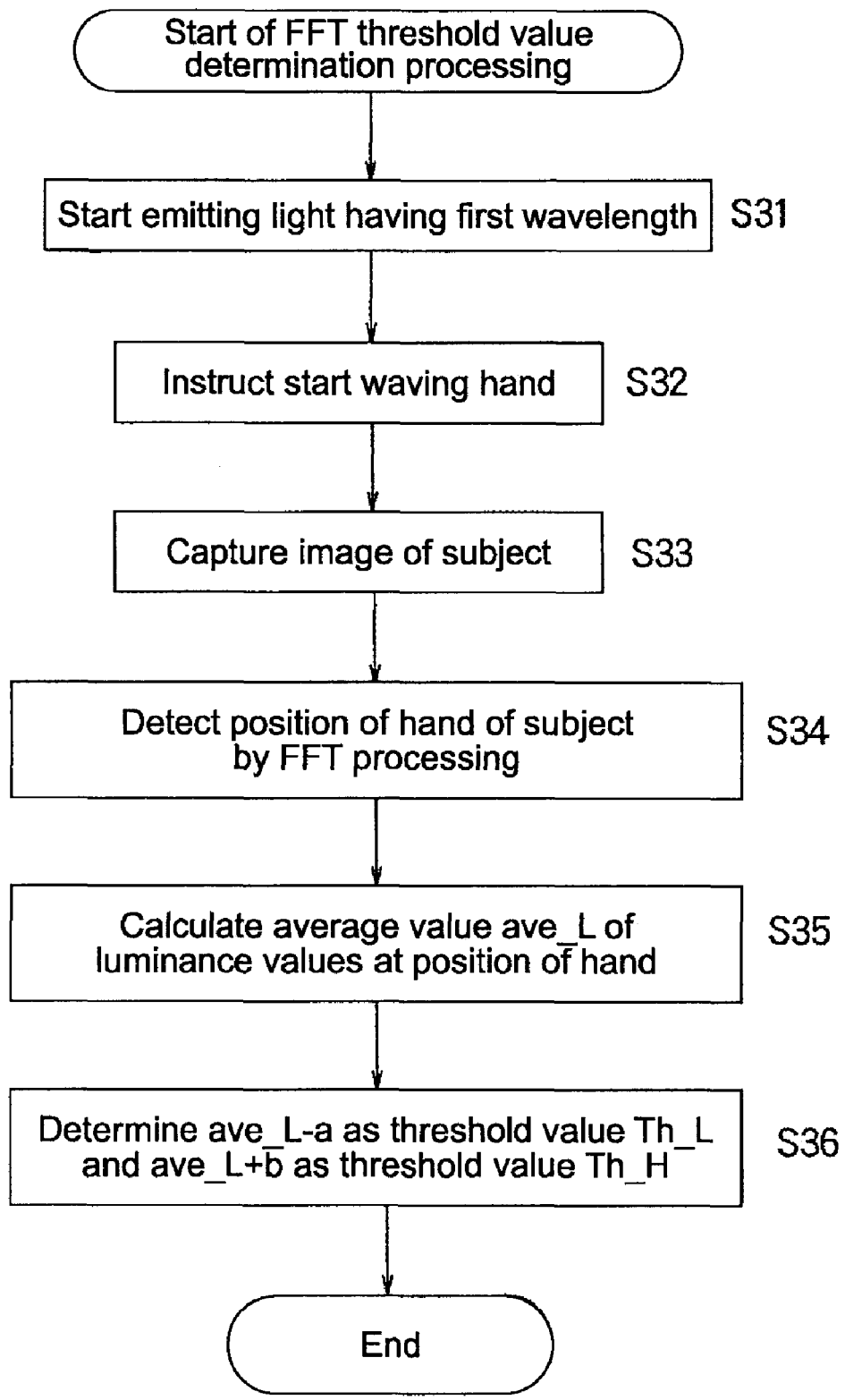
FIG. 17 is a flowchart for explaining the FFT threshold value determination processing.

FIG. 17 is a flowchart for explaining the FFT threshold value determination processing. The FFT threshold value determination processing is started, for example, when a power of the information processing system is turned on and before the shape extraction processing is performed.

In Step S31, the controller 41 controls the LEDs 23a of the light-emitting apparatus 23 to start emitting the light having the first wavelength.

In Step S32, the controller 41 controls a display, a speaker, or the like (not shown) provided in the information processing apparatus 21 to instruct a user to wave the hand.

In Step S33, the camera 22 captures images of the user waving the hand and supplies the resultant first captured images to the threshold value determination section 44 of the information processing apparatus 21.

In Step S34, the threshold value determination section 44 performs the FFT processing on the first captured images and detects a hand area within the first captured image, which moves at a constant frequency.

In Step S35, the threshold value determination section 44 calculates an average value ave_L of the luminance values of the pixels constituting the rectangular area 161 that is a part of the detected hand area.

Step S36, the threshold value determination section 44 determines a value ave_L-a obtained by subtracting an adjustment value a from the average value ave_L as a lower limit threshold value Th_L, and a value ave_L+b obtained by adding an adjustment value b from the average value ave_L as an upper limit threshold value Th_H.

With the above processing, the FFT threshold value determination processing is terminated. As described above, the mask threshold values are determined before the shape extraction processing is performed in the FFT threshold value determination processing, with the result that it is also possible to omit the processing in Steps S6 to S8 and extract the shape of the hand or the like more rapidly in the shape extraction processing.

It should be noted that in the FFT threshold value determination processing, the FFT processing is performed on the plurality of first captured images to detect the hand area within the first captured image, and the mask threshold values (lower limit threshold value Th_L and upper limit threshold value Th_H) are determined based on the average value of the luminance values constituting the pixels within the hand area, but the FFT threshold value determination processing is not limited thereto.

In other words, for example, in the FFT threshold value determination processing, by performing the FFT processing on a plurality of second captured images obtained by capturing images of the user waving the hand by the camera 22, it may be possible to detect a hand area within the second captured image and determine mask threshold values based on an average value of luminance values of pixels within the hand area.

In this embodiment, the binarization section 42 extracts the skin area of the user and the area excluding the skin area of the user from the first captured image and supplies a binarized skin image constituted of the extracted skin area and area excluding the skin area to the skin extraction section 43 and the shape extraction section 46, but it is not limited thereto.

In other words, for example, the binarization section 42 may extract a skin area of the user from the first captured image and supply a binarized skin image including at least the extracted skin area to the skin extraction section 43 and the shape extraction section 46.

In this case, the skin extraction section 43 extracts from the first captured image captured by the camera 22 an area corresponding to the skin area included in the binarized skin image supplied from the binarization section 42. Further, the shape extraction section 46 extracts a shape area from the skin area included in the binarized skin image supplied from the binarization section 42.

In this embodiment, the mask image generation section 45 detects a mask area and a non-mask area from the first captured image, for example, and generates a mask image constituted of the detected mask area and non-mask area, but it is not limited thereto.

In other words, for example, the mask image generation section 45 may detect only the mask area as an extraction area for extracting a shape area from the binarized skin image and generate a mask image including at least the detected mask area. In this case, out of the skin area within the binarized skin image supplied from the binarization section 42, an area corresponding to the mask area within the mask image is extracted as a shape area in the shape extraction section 46.

Further, for example, the mask image generation section 45 may detect only the non-mask area as an extraction area and generate a mask image including at least the detected non-mask area. In this case, out of the skin area within the binarized skin image supplied from the binarization section 42, an area corresponding to the area excluding the non-mask area within the mask image is extracted as a shape area in the shape extraction section 46.

[Performance of Camera 22, LEDs 23a, and LEDs 23b]

Subsequently, with reference to FIGS. 18 and 19, the performance of the camera 22 and the light-emitting apparatus 23 constituting the information processing system 1 when the applicant of the present invention actually carried out the shape extraction processing and the FFT threshold value determination processing will be described.

The applicant of the present invention used a video camera manufactured by Sony Corporation as the camera 22. The camera 22 has a model number XC-EI50 and includes a ½ IT-type CCD as an image pickup device.

Further, the number of effective pixels is 768×494, and a C mount as a lens mount and a scanning method of interlacing 525 lines as a scanning method are adopted in the system.

Further, the sensitivity is F11 (400 [lx]) and a lowest depth of field is 0.1 [lx]. Further, an S/N (signal to noise) ratio of a captured image obtained by the camera 22 capturing an image is 60 [dB].

Moreover, in the camera 22, a shutter speed by a shutter button (normal shutter) provided to the camera 22 in advance is 1/100 to 1/10,000 [sec], and a shutter speed by a release switch (external trigger shutter) externally connected to the camera 22 is ¼ to 1/10,000 [sec].

Further, the camera 22 has an outer dimension of 29 (width)×29 (height)×32 (depth) [mm] and a weight of about 50 [g]. Furthermore, the camera 22 has a vibration resistance of 70 [G].

Moreover, the camera 22 has a sensitivity within a range from a visible region of 400 [nm] to a near-infrared region of 1,000 [nm].

Figure 18:
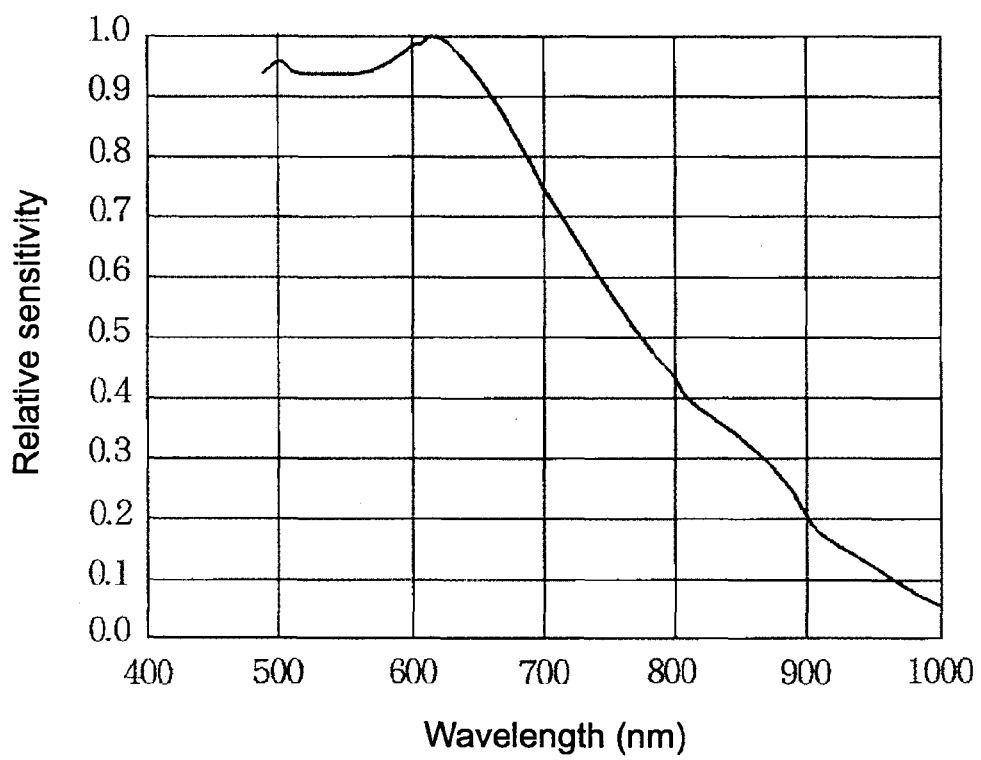
FIG. 18 is a diagram showing relative sensitivity characteristics of a camera.

FIG. 18 shows an example of relative sensitivity characteristics of the camera 22.

It should be noted that in FIG. 18, the horizontal axis indicates a wavelength that is incident to a lens of the camera 22 and the vertical axis indicates a relative sensitivity corresponding to the wavelength.

Figure 19:
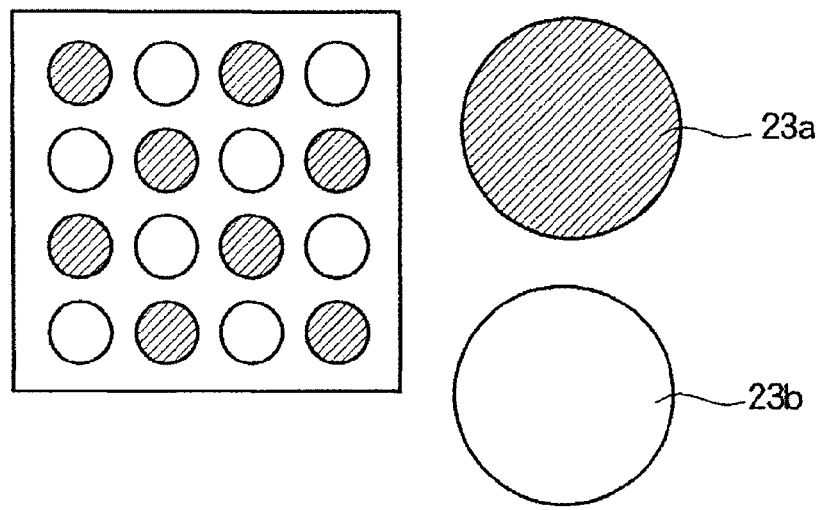
FIG. 19 is a diagram showing an arrangement method for LEDs.

Further, the applicant of the present invention used, as shown in FIG. 19, eight LEDs 23a and eight LEDs 23b that were alternately arranged in a grid as shown in FIG. 19.

As the LEDs 23a actually used by the applicant of the present invention, LEDs that emit light having a wavelength of 870 [nm] were used, and as the LEDs 23b, LEDs that emit light having a wavelength of 950 [nm] were used.

In addition, LEDs having a DC forward current (absolute maximum rating) of 100 [mA] and a forward voltage of 1.6 [V] were used as the LEDs 23a and LEDs 23b.

The applicant of the present invention actually carried out the shape extraction processing and the FFT threshold value determination processing while using the camera 22 having the performance described above and the LEDs 23a and LEDs 23b arranged as shown in FIG. 19, and accordingly could find the evident operational effect described above.

In this embodiment, the mask image generation section 45 generates a mask image from the first captured image supplied from the camera 22 based on the mask threshold value supplied from the threshold value determination section 44, but the method of generating a mask image is not limited to the above.

In other words, for example, the mask image generation section 45 can perform stereo processing of generating a distance image representing a distance from a camera to a user based on captured images captured by a plurality of cameras that capture images in different directions and adopt the resultant distance image as a mask image.

In this case, the shape extraction section 46 extracts a portion in which an area representing a distance from the camera to the hand within the distance image supplied from the mask image generation section 45 overlaps the face area 101 and hand area 102 within the binarized skin image supplied from the binarization section 42, as a shape area 141 representing the shape of the hand of the user.

Further, as the method of generating the distance image as a mask image, in addition to the stereo processing, it is possible to generate a distance image of the user while using a laser range finder or the like that calculates a distance to the user based on a time during which infrared rays are irradiated to the user and returned by being reflected on the user.

Further, in this embodiment, the first wavelength emitted from the LEDs 23a is set to 870 [nm] and the second wavelength emitted from the LEDs 23b is set to 950 [nm], but the combination of the wavelengths is not limited thereto.

Specifically, any combination of wavelengths may be set as long as the combination leads to a sufficiently larger difference absolute value between a reflectance in the first wavelength and a reflectance in the second wavelength than a difference absolute value between reflectances obtained for an object other than the skin of the user. Specifically, as is apparent from FIG. 3, for example, a combination of 800 [nm] and 950 [nm], that of 870 [nm] and 1,000 [nm], and that of 800 [nm] and 1,000 [nm] may be possible in addition to the combination of 870 [nm] and 950 [nm].

It should be noted that the combination of a first wavelength $\lambda 1$ and a second wavelength $\lambda 2$ is desirably set to be a combination that satisfies, for example, the following relationships, $\lambda 1 < \lambda 2$, $630 \text{ nm} \leq \lambda 1 \leq 1{,}000 \text{ nm}$, and $900 \text{ nm} \leq \lambda 2 \leq 1{,}100 \text{ nm}$.

It should be noted that in a case where visible light is used as the light emitted from the LEDs 23a, a filter that passes only the visible light emitted from the LEDs 23a and causes the visible light to enter the lens of the camera 22 is used instead of the visible light cut filter 22a. The same holds true for the LEDs 23b.

Further, in this embodiment, the LEDs 23a and LEDs 23b emit light individually in the shape extraction processing. However, it is possible to acquire a first captured image and a second captured image by causing the LEDs 23a and LEDs 23b to emit light simultaneously.

Specifically, for example, two cameras having the same function as the camera 22 are provided close to each other instead of the camera 22. A filter to pass only the light having the first wavelength is provided in front of one camera out of the two cameras, and a filter to pass only the light having the second wavelength is provided in front of the other camera.

In this case, even when the LEDs 23a and LEDs 23b are caused to emit light simultaneously, only the light having the first wavelength enters the one camera, with the result that it is possible to obtain a first captured image in the one camera. Further, since only the light having the second wavelength enters the other camera, it is possible to obtain a second captured image in the other camera.

In this embodiment, the number of LEDs 23a and the number of LEDs 23b are each set to two, but the number of them is not limited to the above.

Specifically, the number of LEDs 23a and the number of LEDs 23b are appropriately set such that light having power (intensity) necessary for the skin detection is uniformly applied to a subject such as a user.

In addition, in this embodiment, (the shape of) the hand as an object representing a part of the user is changed to cause the information processing apparatus 21 to execute the predetermined processing, but it is possible to adopt a foot of the user or the like as an object, in addition to the hand.

Further, in this embodiment, based on the luminance values of pixels, the upper limit threshold value Th_H and the lower limit threshold value Th_L are determined or a so-called click operation is detected, but any one of an R value, a G value, and a B value of RGB (Red, Green, Blue) values of pixels may be used instead of the luminance value, for example.

Specifically, instead of the luminance value, any value may be used as long as it is a value proportional to a luminance value.

Figure 20:
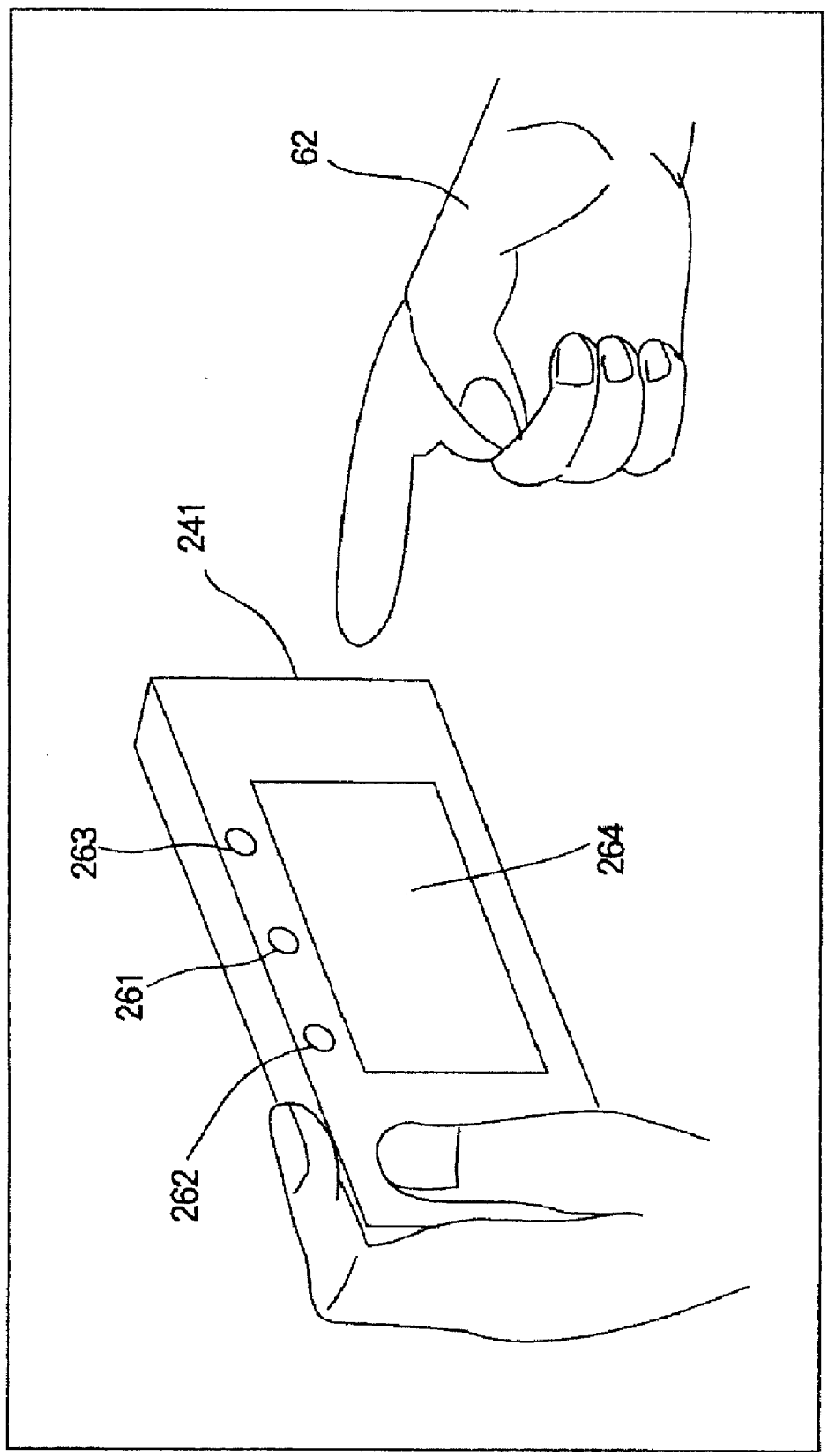
FIG. 20 is a diagram showing an example of a mobile device to which the present invention is applied.

The present invention is applicable to, in addition to the information processing system 1, a mobile device 241 (for example, digital camera, cellular phone, etc.) constituted of a camera unit 261 having a function similar to that of the camera 22, an LED unit 262 having a function similar to that of the LED 23a, an LED unit 263 having a function similar to that of the LED 23b, and a display unit 264 that displays an image for determining composition (so-called through image) or the like, as shown in FIG. 20.

In a case where the mobile device 241 is used, a posture or gesture is made in a state where a relative distance between the LED units 263 and 264 and the hand 62 of the user is relatively short. As described above with reference to FIG. 14, a change in luminance value due to a distance becomes large as a relative distance between the LED units 263 and 264 and the hand 62 is short. Therefore, in a case where the mobile device 241 is used, for example, a tip portion of an index finger of the user can be extracted relatively precisely.

With this structure, the finger of the user is unnecessary to come into contact with the display unit as in a so-called touch panel, and because the mobile device can be operated by the movement of a finger in the vicinity of the display unit, the display unit is not soiled by fingerprints or the like.

Further, the example in which the tip portion of an index finger is extracted has been described here, but in a case where the end of an index finger and the end of a thumb are close to the LED units 263 and 264, it is possible to extract both of them to be used for operation.

Figure 21:
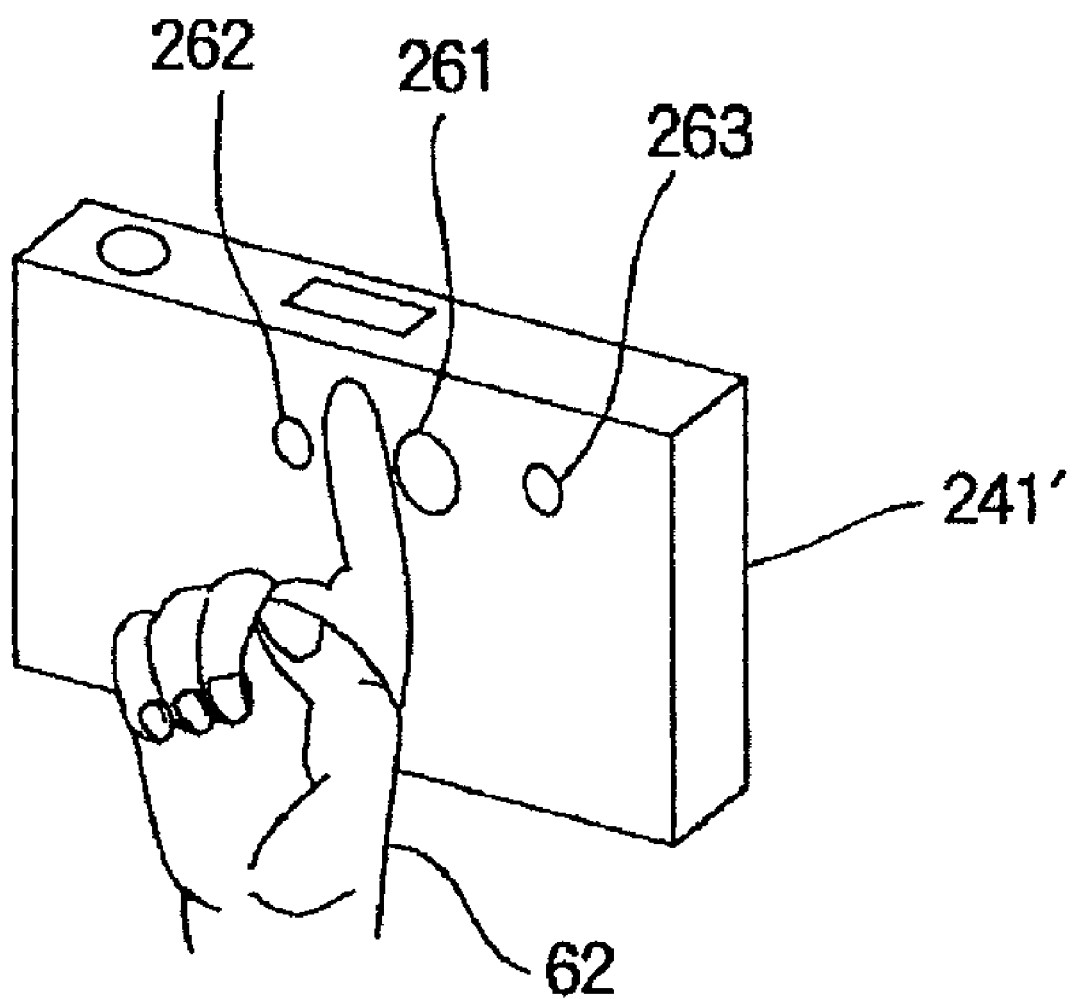
FIG. 21 is a diagram showing an example of another mobile device to which the present invention is applied.
Figure 22:
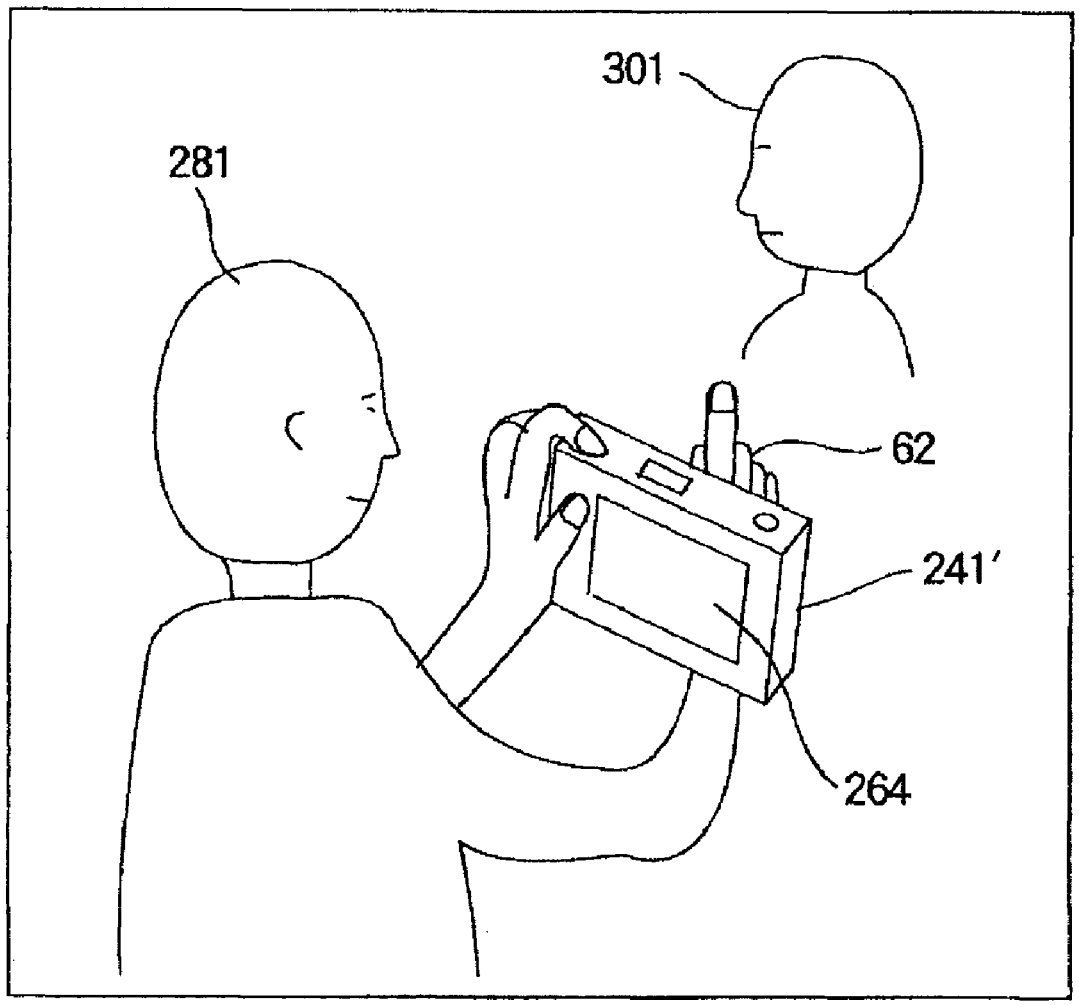
FIG. 22 is a diagram showing an example of a case where another mobile device to which the present invention is applied is used.

Further, as shown in FIG. 21, in a case of using a mobile device 241' including the camera unit 261, the LED units 262 and 263 on a surface opposite to the surface on which the display unit 264 is provided, the user makes a posture or gesture as shown in FIG. 22.

By providing such a structure to a mobile device, the display unit is not covered by the hand or finger of the user, which provides ease of operation. Particularly, since the display unit is small in a mobile device, in a case where one content is selected from a plurality of contents or the like displayed on the display unit, a content to be selected is covered by a finger when the finger is on the display unit. In contrast to this, in the present invention of the subject application, the display unit does not overlap a finger operating when viewed from the user, which improves operability. In addition, with such a structure, the influence of external light such as sunlight can be alleviated.

Further, such a mobile device incorporates a general camera in many cases. Aside from this camera, a camera for skin detection may be provided. Alternatively, it may be possible to use a camera shared with a general camera and only in a mode of performing skin detection, shift the camera to a position at which a visible light cut filter is set effective.

In the case shown in FIG. 22, an image of a skin of a person 301 other than a user 281 is also captured by the camera unit 261 of the mobile device 241', in addition to a hand 62 of the user 281. However, using the method described above, it is possible to distinguish a skin portion of the person 301 from the hand 62 of the user 281 and extract the hand 62 precisely.

Figure 23:
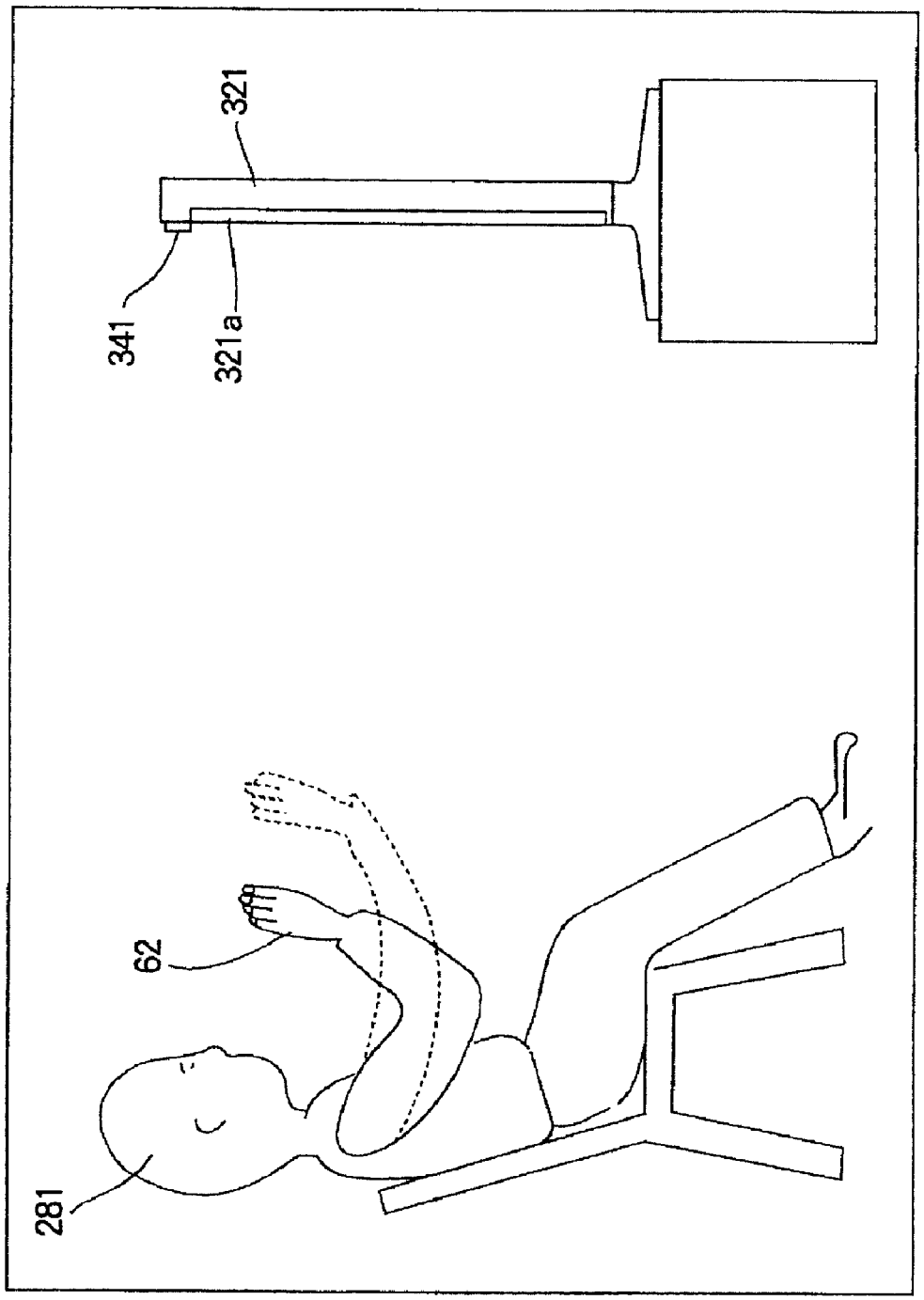
FIG. 23 is a diagram showing an example of a television receiver to which the present invention is applied.

In addition, as shown in FIG. 23, the present invention is applicable to a television receiver 321 in which a recognition processing unit 341 having a function similar to that of the information processing system 1 is incorporated on an upper side of a display 321*a*.

In this case, the user 281 changes the shape of the hand 62 or the like in front of the display 321*a* of the television receiver 321, or performs an operation of shifting the hand 62 or the like, with the result that it is possible to cause the television receiver 321 to execute the processing of changing a channel, volume, or the like of the television receiver 321.

Further, in this case, it is possible to perform an operation by using the hand 62 as a mouse of a personal computer. Specifically, it is possible to make a determination operation by selecting a specific one from options such as a plurality of contents displayed on a screen of a television receiver, while moving the hand from right to left or up and down as if shifting a mouse, and additionally moving the hand back and forth (in a direction of television receiver when viewed from the user) as if moving the mouse. Those operations are easy to understand intuitively.

The backward and forward movements when the determination is made can be detected based on a change in luminance value of the hand as a skin portion of the user.

Specifically, based on a first image obtained by receiving reflected light at a time when the user is irradiated with light having a first wavelength and a second image obtained by receiving reflected light at a time when the user is irradiated with light having a second wavelength that is different from the first wavelength, a skin area of a face, a hand, or the like of the user is extracted and the hand of the user is extracted based on distribution of luminance values of pixels constituting the skin area from the extracted skin area. Further, a change in relative distance from an irradiation means (light-emitting apparatus 23) to the hand is detected based on a change in luminance value of the area of the hand of the user, and a determination operation is executed based on the change in the detected relative distance, that is, the movement of the hand in backward and forward directions.

It goes without saying that those operations can also be applied to a case where a similar function is incorporated in a personal computer.

Incidentally, a series of processing described above can be executed by dedicated hardware or software. In a case where the series of processing is executed by software, programs constituting the software are installed from a recording medium in a so-called built-in computer or a general-purpose personal computer that can execute various functions by installing various programs.

[Structure Example of Computer]

Figure 24:
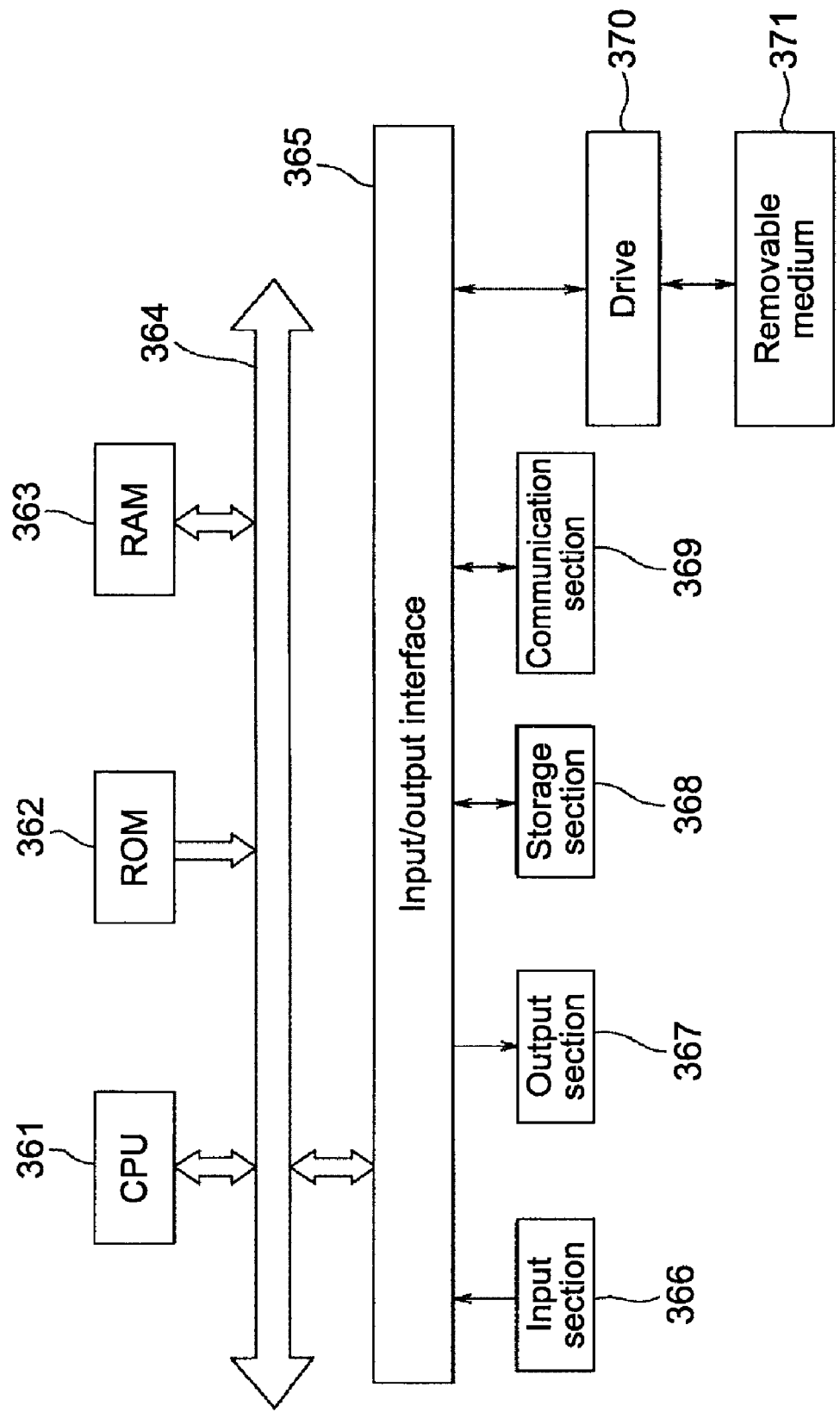
FIG. 24 is a block diagram showing a structure example of a computer.

Next, FIG. 24 shows a structure example of a personal computer that executes the series of processing described above by programs.

A CPU (Central Processing Unit) 361 executes various types of processing in accordance with programs stored in a ROM (Read Only Memory) 362 or a storage section 368. A RAM (Random Access Memory) 363 stores programs to be executed by the CPU 361, data, and the like as appropriate. Those CPU 361, ROM 362, and RAM 363 are connected to each other via a bus 364.

Further, the CPU 361 is connected with an input/output interface 365 via the bus 364. The input/output interface 365 is connected with an input section 366 constituted of a keyboard, a mouse, a microphone, and the like and an output section 367 constituted of a display, a speaker, and the like. The CPU 361 executes various types of processing in accordance with commands that are input from the input section 366. Then, the CPU 361 outputs results of the processing to the output section 367.

The storage section 368 connected to the input/output interface 365 is constituted of, for example, a hard disk and stores programs to be executed by the CPU 361 and various types of data. A communication section 369 communicates with an external apparatus via a network such as the Internet and a local area network.

Further, a program may be acquired via the communication section 369 and stored in the storage section 368.

A drive 370 connected to the input/output interface 365 drives a removable medium 371 such as a magnetic disc, an optical disc, a magnetic optical disc, or a semiconductor memory when the removable medium 371 is mounted thereto, and acquires programs, data, or the like recorded therein. The acquired programs or data are transferred to the storage section 368 as necessary and stored therein.

A recording medium that records (stores) programs installed in and executed by the computer is constituted of, as shown in FIG. 24, the removable medium 371 that is a package medium such as a magnetic disc (including a flexible disc), an optical disc (including a CD-ROM (Compact Disc-Read Only Memory) and a DVD (Digital Versatile Disc)), a magnetic optical disc (including an MD (Mini-Disc)), and a semiconductor memory, the ROM 362 in which programs are temporarily or permanently stored, a hard disk constituting the storage section 368, or the like. The programs are recorded on the recording medium via the communication section 369 as an interface such as a router and a modem as appropriate while using a wireless or wired communication medium such as a local area network, the Internet, and a digital broadcast.

It should be noted that in this specification, the steps describing the above series of processing include, in addition to processing that are performed in time series along the described order, processing that are executed in parallel or individually though not processed chronologically.

Moreover, in this specification, the system refers to the whole of the apparatus constituted of a plurality of apparatuses.

It should be noted that the embodiment of the present invention is not limited to this embodiment described above and can variously modified without departing from the gist of the present invention.

REFERENCE SIGNS LIST

Description of Reference Numerals 1 information processing system
21 information processing apparatus
22 camera
23 light-emitting apparatus
41 controller
42 binarization section
43 skin extraction section
44 threshold value determination section
45 mask image generation section
46 shape extraction section

The invention claimed is:

1. An information processing apparatus, comprising:
an irradiation means for irradiating the user with light having a first wavelength and light having a second wavelength that is different from the first wavelength;
an acquisition means for acquiring a first image and a second image, the first image being obtained by receiving reflected light of the light having the first wavelength with which the user is irradiated, the second image being obtained by receiving reflected light of the light having the second wavelength with which the user is irradiated;
an object area extraction means for extracting an object area in which an object representing a predetermined skin portion of a body of the user is displayed, from a skin display area in a display image including the skin display area in which a skin of the user is displayed, based on the first and second images; and
a distance change detection means for detecting a change in relative distance from the irradiation means to the object in accordance with a change of luminance values of pixels constituting the object area in the display image or a value calculated based on the luminance values.

2. The information processing apparatus according to claim 1, further comprising
a part display area detection means for detecting an area constituted of pixels included in a top n percent of large luminance values out of the pixels constituting the object area in the display image, as the part display area in which a part of the object is displayed.

3. The information processing apparatus according to claim 2,
wherein the distance change detection means detects a change in relative distance to the part of the object, the part being displayed in the part display area, in accordance with a change of luminance values of pixels constituting the part display area of the object area in the display image or a value calculated based on the luminance values.

4. The information processing apparatus according to claim 1,
wherein the object area extraction means
detects a shape area representing a shape of the object in the skin display area based on distribution of luminance values of pixels constituting the skin display area in the display image, and
extracts the object area corresponding to the shape area from the skin display area.

5. The information processing apparatus according to claim 1,
wherein the distance change detection means detects a change in relative distance from the irradiation means to the object in accordance with a change in average value of the luminance values of the pixels constituting the object area in the display image.

6. The information processing apparatus according to claim 1,
wherein the first wavelength $\lambda 1$ and the second wavelength $\lambda 2$ satisfy relationships of the following expressions, $\lambda 1 < \lambda 2$, 630 nm $\leq \lambda 1 \leq$ 1,000 nm, and 900 nm $\leq \lambda 2 \leq$ 1,100 nm.

7. An information processing method for an information processing apparatus that detects a change in distance from a user, the information processing apparatus including an irradiation means, an acquisition means, an object area extraction means, and a distance change detection means, the method comprising:
irradiating, by the irradiation means, the user with light having a first wavelength and light having a second wavelength that is different from the first wavelength;
acquiring, by the acquisition means, a first image and a second image, the first image being obtained by receiving reflected light of the light having the first wavelength with which the user is irradiated, the second image being obtained by receiving reflected light of the light having the second wavelength with which the user is irradiated;
extracting, by the object area extraction means, an object area in which an object representing a predetermined skin portion of a body of the user is displayed, from a skin display area in a display image including the skin display area in which a skin of the user is displayed, based on the first and second images; and
detecting, by the distance change detection means, a change in relative distance from the irradiation means to the object in accordance with a change of luminance values of pixels constituting the object area in the display image or a value calculated based on the luminance values.

8. A non-transitory computer readable medium storing a program for causing a computer that controls an information processing apparatus including an irradiation means for irradiating the user with light having a first wavelength and light having a second wavelength that is different from the first wavelength, to function as:

an acquisition means for acquiring a first image and a second image, the first image being obtained by receiving reflected light of the light having the first wavelength with which the user is irradiated, the second image being obtained by receiving reflected light of the light having the second wavelength with which the user is irradiated;

an object area extraction means for extracting an object area in which an object representing a predetermined skin portion of a body of the user is displayed, from a skin display area in a display image including the skin display area in which a skin of the user is displayed, based on the first and second images; and a distance change detection means for detecting a change in relative distance from the irradiation means to the object in accordance with a change of luminance values of pixels constituting the object area in the display image or a value calculated based on the luminance values.

9. An electronic apparatus, comprising:

an irradiation means for irradiating the user with light having a first wavelength and light having a second wavelength that is different from the first wavelength;

an acquisition means for acquiring a first image and a second image, the first image being obtained by receiving reflected light of the light having the first wavelength with which the user is irradiated, the second image being obtained by receiving reflected light of the light having the second wavelength with which the user is irradiated;

an object area extraction means for extracting an object area in which an object representing a predetermined skin portion of a body of the user is displayed, from a skin display area in a display image including the skin display area in which a skin of the user is displayed, based on the first and second images;

a distance change detection means for detecting a change in relative distance from the irradiation means to the object in accordance with a change of luminance values of pixels constituting the object area in the display image or a value calculated based on the luminance values; and an execution means for executing predetermined processing in response to the detection of the change in relative distance from the irradiation means to the object.

10. An information processing apparatus that extracts a shape of an object representing a predetermined skin portion of a body of a user from a captured image obtained by capturing an image of the user, the information processing apparatus comprising:

an irradiation means for irradiating the user with light having a first wavelength and light having a second wavelength that is different from the first wavelength;

an acquisition means for acquiring a first image and a second image, the first image being obtained by receiving reflected light of the light having the first wavelength with which the user is irradiated, the second image being obtained by receiving reflected light of the light having the second wavelength with which the user is irradiated;

a difference value calculation means for calculating a difference value representing a difference in reflectance between the light having the first wavelength and the light having the second wavelength, for each of pixels constituting the first or second image;

a skin area extraction means for extracting a skin area representing a skin of the user based on whether the difference value calculated for each of the pixels constituting the first or second image is equal to or larger than a predetermined threshold value; and a shape area extraction means for extracting a shape area representing the shape of the object in the skin area, wherein the shape area extraction means extracts the shape area based on distribution of luminance values of pixels constituting an area corresponding to the skin area in a display image in which the object and a portion of the user that corresponds to an area excluding the shape area in the skin area are displayed.

11. The information processing apparatus according to claim 10, wherein the difference value calculation means calculates the difference value obtained by normalizing a difference obtained by subtracting luminance values of the second image from luminance values of the first image.

12. The information processing apparatus according to claim 10, wherein the difference value calculation means calculates, as the difference value, a ratio of luminance values of the first image and luminance values of the second image.

13. An information processing method for an information processing apparatus that extracts a shape of an object representing a predetermined skin portion of a body of a user from a captured image obtained by capturing an image of the user, the information processing apparatus including an irradiation means, an acquisition means, a difference value calculation means, a skin area extraction means, and a shape area extraction means, the method comprising:

irradiating, by the irradiation means, the user with light having a first wavelength and light having a second wavelength that is different from the first wavelength;

acquiring, by the acquisition means, a first image and a second image, the first image being obtained by receiving reflected light of the light having the first wavelength with which the user is irradiated, the second image being obtained by receiving reflected light of the light having the second wavelength with which the user is irradiated;

calculating, by the difference value calculation means, a difference value representing a difference in reflectance between the light having the first wavelength and the light having the second wavelength, for each of pixels constituting the first or second image;

extracting, by the skin area extraction means, a skin area representing a skin of the user based on whether the difference value calculated for each of the pixels constituting the first or second image is equal to or larger than a predetermined threshold value; and extracting, by the shape area extraction means, a shape area representing the shape of the object in the skin area, wherein the shape area extraction means extracts the shape area based on distribution of luminance values of pixels constituting an area corresponding to the skin area in a display image in which the object and a portion of the user that corresponds to an area excluding the shape area in the skin area are displayed.

14. A non-transitory computer readable medium storing a program causing a computer that controls an information processing apparatus that extracts a shape of an object representing a predetermined skin portion of a body of a user from a captured image obtained by capturing an image of the user, and that includes an irradiation means for irradiating the user with light having a first wavelength and light having a second wavelength that is different from the first wavelength, to function as:

an acquisition means for acquiring a first image and a second image, the first image being obtained by receiving reflected light of the light having the first wavelength with which the user is irradiated, the second image being obtained by receiving reflected light of the light having the second wavelength with which the user is irradiated;

a difference value calculation means for calculating a difference value representing a difference in reflectance between the light having the first wavelength and the light having the second wavelength, for each of pixels constituting the first or second image;

a skin area extraction means for extracting a skin area representing a skin of the user based on whether the difference value calculated for each of the pixels constituting the first or second image is equal to or larger than a predetermined threshold value; and a shape area extraction means for extracting a shape area representing the shape of the object in the skin area, wherein the shape area extraction means extracts the shape area based on distribution of luminance values of pixels constituting an area corresponding to the skin area in a display image in which the object and a portion of the user that corresponds to an area excluding the shape area in the skin area are displayed.

15. An electronic apparatus that extracts a shape of an object representing a predetermined skin portion of a body of a user from a captured image obtained by capturing an image of the user, the electronic apparatus comprising:

an irradiation means for irradiating the user with light having a first wavelength and light having a second wavelength that is different from the first wavelength;

an acquisition means for acquiring a first image and a second image, the first image being obtained by receiving reflected light of the light having the first wavelength with which the user is irradiated, the second image being obtained by receiving reflected light of the light having the second wavelength with which the user is irradiated;

a difference value calculation means for calculating a difference value representing a difference in reflectance between the light having the first wavelength and the light having the second wavelength, for each of pixels constituting the first or second image;

a skin area extraction means for extracting a skin area representing a skin of the user based on whether the difference value calculated for each of the pixels constituting the first or second image is equal to or larger than a predetermined threshold value;

a shape area extraction means for extracting a shape area representing the shape of the object in the skin area; and an execution means for executing processing that corresponds to the extracted shape area, wherein the shape area extraction means extracts the shape area based on distribution of luminance values of pixels constituting an area corresponding to the skin area in a display image in which the object and a portion of the user that corresponds to an area excluding the shape area in the skin area are displayed.

* * * * *